(12) United States Patent
Fujikura et al.

(10) Patent No.: US 10,288,856 B2
(45) Date of Patent: May 14, 2019

(54) VARIABLE MAGNIFICATION OPTICAL SYSTEM AND IMAGE PICKUP APPARATUS USING THE SAME

(71) Applicant: OLYMPUS CORPORATION, Hachioji-shi, Tokyo (JP)

(72) Inventors: Takashi Fujikura, Hamura (JP); Yuki Zen, Hino (JP); Tomoyuki Satori, Yokohama (JP); Tetsuya Yanai, Tachikawa (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/948,155

(22) Filed: Apr. 9, 2018

(65) Prior Publication Data

US 2018/0329186 A1 Nov. 15, 2018

(30) Foreign Application Priority Data

May 9, 2017 (JP) ................................. 2017-093100

(51) Int. Cl.
| | |
|---|---|
| *G02B 15/14* | (2006.01) |
| *G02B 15/15* | (2006.01) |
| *G02B 9/64* | (2006.01) |
| *G02B 5/00* | (2006.01) |
| *G02B 9/14* | (2006.01) |
| *G02B 13/18* | (2006.01) |
| *G02B 15/173* | (2006.01) |
| *G02B 15/20* | (2006.01) |
| *G02B 13/00* | (2006.01) |

(52) U.S. Cl.
CPC ............... *G02B 15/15* (2013.01); *G02B 9/64* (2013.01); *G02B 5/005* (2013.01); *G02B 9/14* (2013.01); *G02B 13/009* (2013.01); *G02B 13/18* (2013.01); *G02B 15/14* (2013.01); *G02B 15/173* (2013.01); *G02B 15/20* (2013.01)

(58) Field of Classification Search
CPC ...... G02B 15/173; G02B 15/20; G02B 15/14; G02B 13/009; G02B 13/18; G02B 5/005; G02B 9/14
USPC ........ 359/683–685, 689, 690, 716, 740, 785
See application file for complete search history.

(56) References Cited

U.S. PATENT DOCUMENTS

| | | | | |
|---|---|---|---|---|
| 4,398,808 | A * | 8/1983 | Fujibayashi | ......... G02B 15/173 359/686 |
| 8,441,738 | B2 * | 5/2013 | Ohmoto | ............. G02B 27/0062 359/683 |

(Continued)

FOREIGN PATENT DOCUMENTS

JP 2016099549 A 5/2016

*Primary Examiner* — Evelyn A Lester
(74) *Attorney, Agent, or Firm* — Holtz, Holtz & Volek PC

(57) ABSTRACT

A variable magnification optical system includes a first lens unit having a positive refractive power, a second lens unit having a negative refractive power, a third lens unit having a positive refractive power, and at least one lens unit. A second predetermined positive lens element satisfies conditional expressions (1) and (2) and a second predetermined negative lens element satisfies the following conditional expressions (3) and (4). The second lens unit includes three sub-lens units and the following conditional expressions (5) and (6) are satisfied:

$$0.520 < (\theta g, F)G2p < 0.610 \qquad (1),$$

$$0.680 < (\theta C, t)G2p < 0.900 \qquad (2),$$

$$0.520 < (\theta g, F)G2n < 0.560 \qquad (3),$$

$$0.750 < (\theta C, t)G2n < 0.900 \qquad (4),$$

(Continued)

$$-0.25 < fG21/fG22 < 0.90 \quad (5), \text{ and}$$

$$-0.70 < fG21/fG23 < 0.40 \quad (6).$$

19 Claims, 16 Drawing Sheets

(56) References Cited

U.S. PATENT DOCUMENTS

| | | | |
|---|---|---|---|
| 8,570,662 B2* | 10/2013 | Eguchi | G02B 15/173 |
| | | | 359/683 |
| 9,239,452 B2* | 1/2016 | Ono | G02B 9/34 |
| 2003/0072086 A1* | 4/2003 | Uzawa | G02B 15/173 |
| | | | 359/687 |
| 2009/0296231 A1* | 12/2009 | Shirasuna | G02B 15/173 |
| | | | 359/687 |
| 2013/0050566 A1* | 2/2013 | Saito | G02B 13/18 |
| | | | 359/684 |
| 2015/0241676 A1* | 8/2015 | Komatsu | G02B 15/17 |
| | | | 359/683 |
| 2015/0355436 A1* | 12/2015 | Shimada | G02B 15/173 |
| | | | 359/684 |
| 2016/0062135 A1* | 3/2016 | Kawamura | G02B 15/173 |
| | | | 359/557 |
| 2016/0109691 A1* | 4/2016 | Kajiyama | G02B 13/146 |
| | | | 359/354 |
| 2016/0147048 A1 | 5/2016 | Nakano et al. | |
| 2016/0259155 A1* | 9/2016 | Shimada | G02B 15/173 |

* cited by examiner

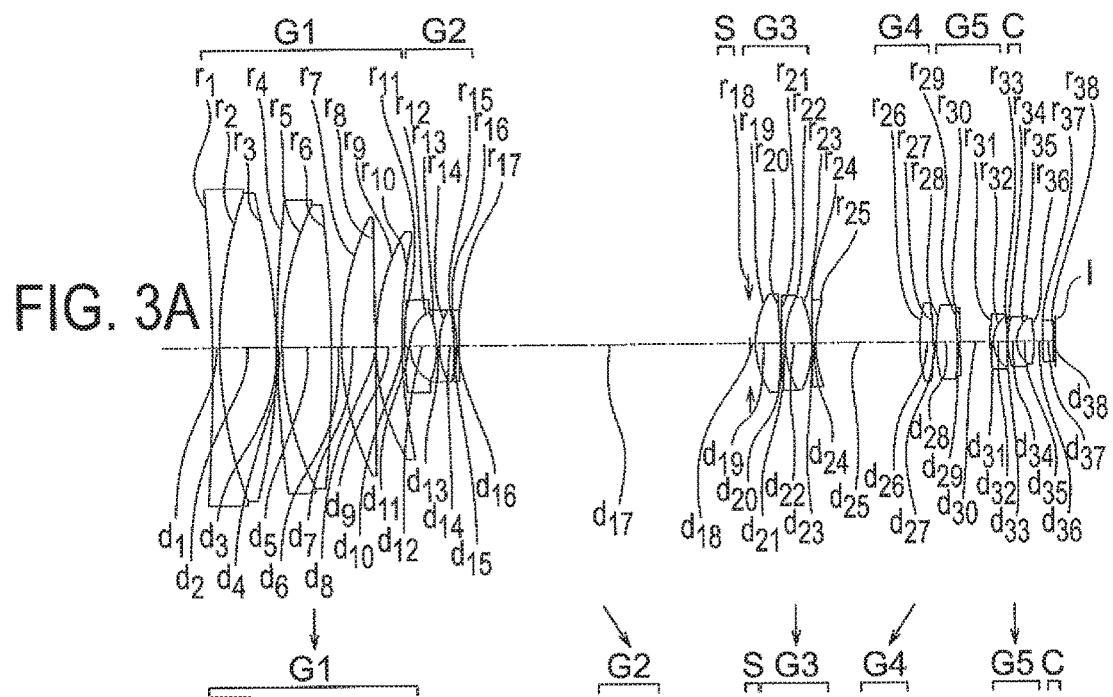
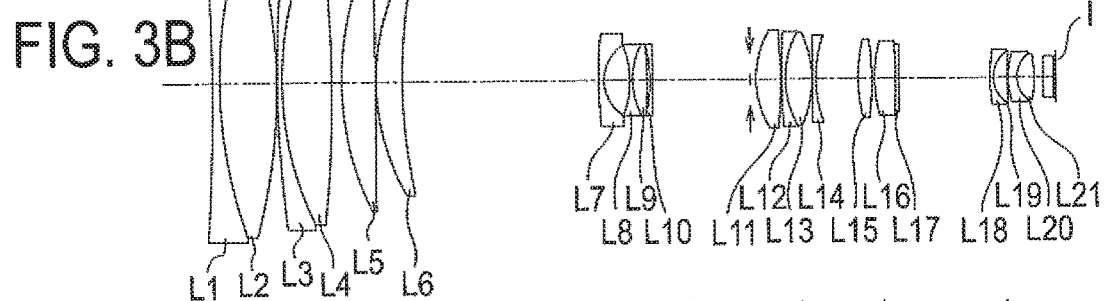
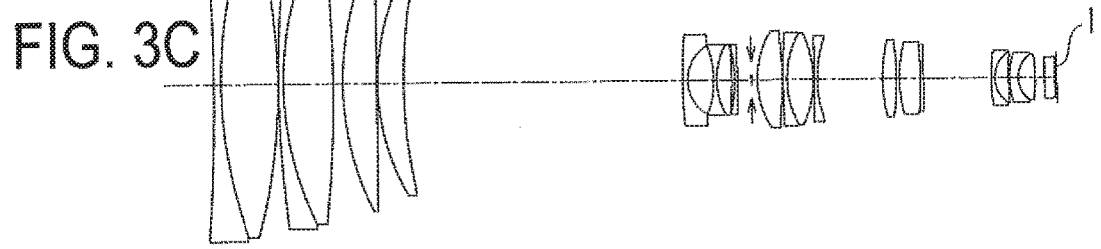

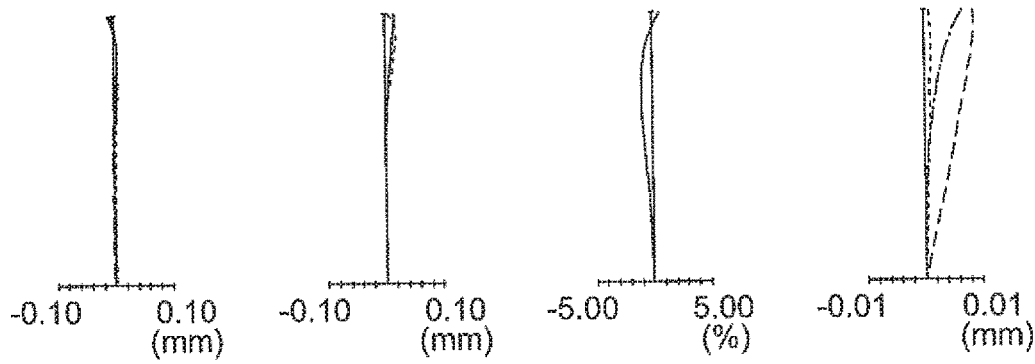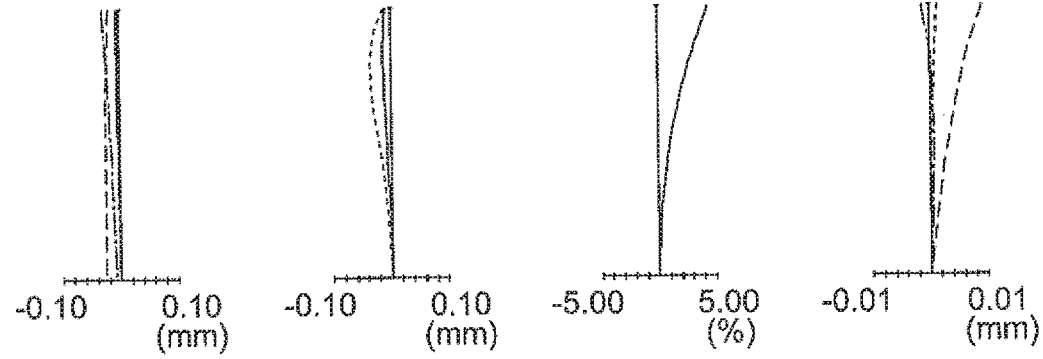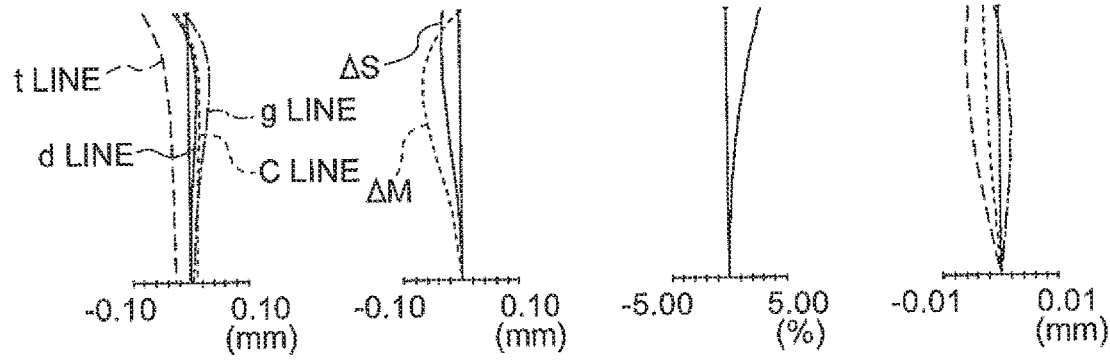

SA
FNO 1.600
-0.10  0.10
(mm)

AS
ω 34.86
-0.10  0.10
(mm)

DT
ω 34.86
-5.00  5.00
(%)

CC
ω 34.86
-0.01  0.01
(mm)

SA
FNO 2.986
-0.10  0.10
(mm)

AS
ω 6.72
-0.10  0.10
(mm)

DT
ω 6.72
-5.00  5.00
(%)

CC
ω 6.72
-0.01  0.01
(mm)

SA
FNO 3.297
-0.10  0.10
(mm)

AS
ω 1.24
-0.10  0.10
(mm)

DT
ω 1.24
-5.00  5.00
(%)

CC
ω 1.24
-0.01  0.01
(mm)

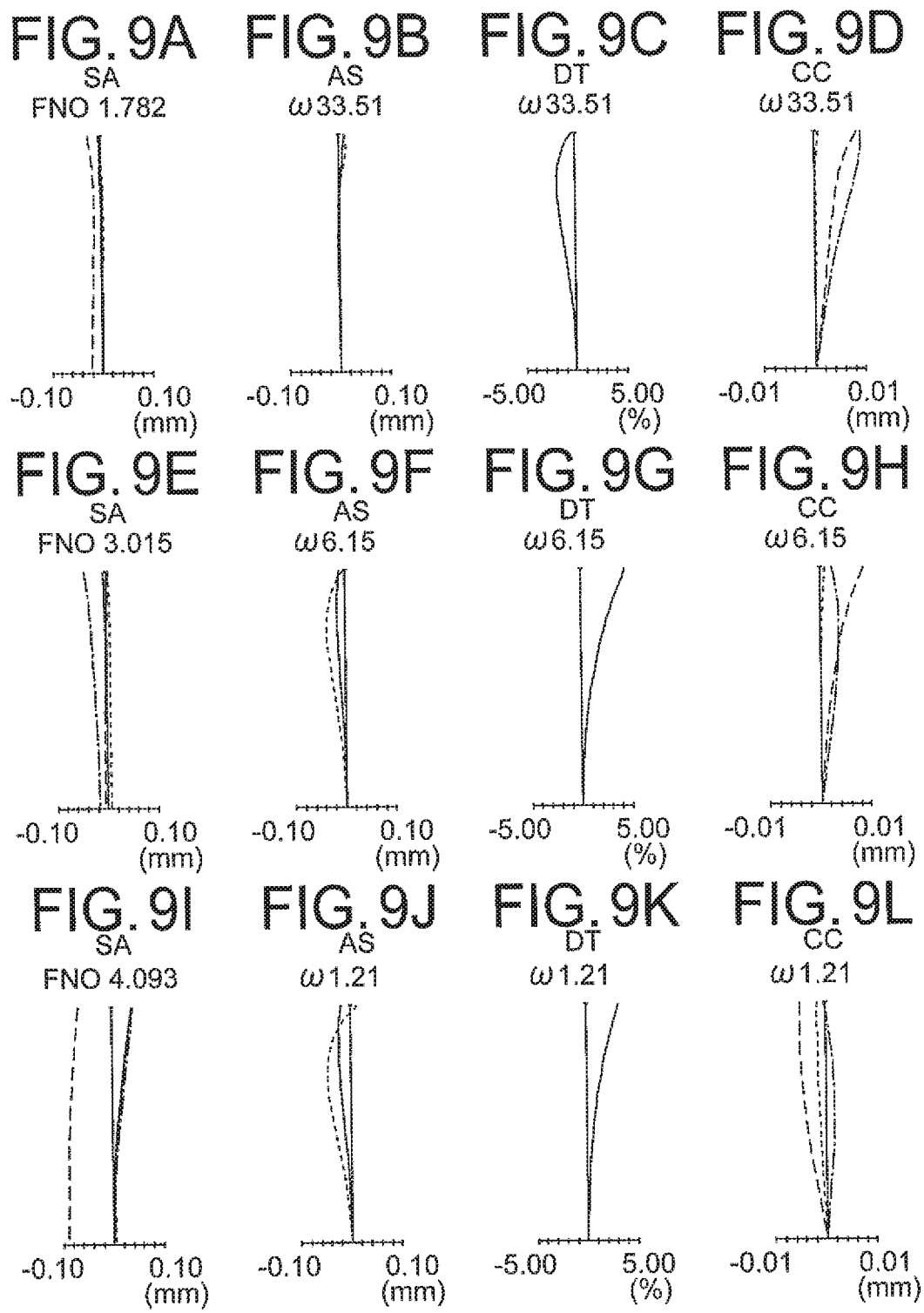

SA
FNO 1.802
-0.10   0.10
(mm)

AS
ω 33.41
-0.10   0.10
(mm)

DT
ω 33.41
-5.00   5.00
(%)

CC
ω 33.41
-0.01   0.01
(mm)

SA
FNO 3.018
-0.10   0.10
(mm)

AS
ω 6.15
-0.10   0.10
(mm)

DT
ω 6.15
-5.00   5.00
(%)

CC
ω 6.15
-0.01   0.01
(mm)

SA
FNO 4.056
-0.10   0.10
(mm)

AS
ω 1.09
-0.10   0.10
(mm)

DT
ω 1.09
-5.00   5.00
(%)

CC
ω 1.09
-0.01   0.01
(mm)

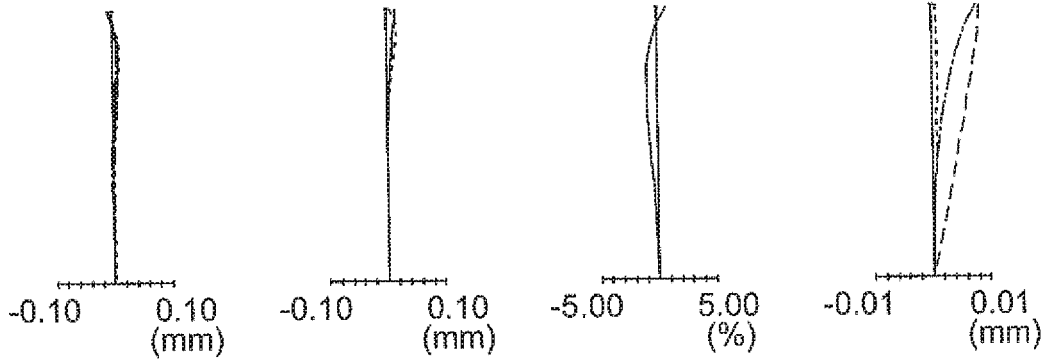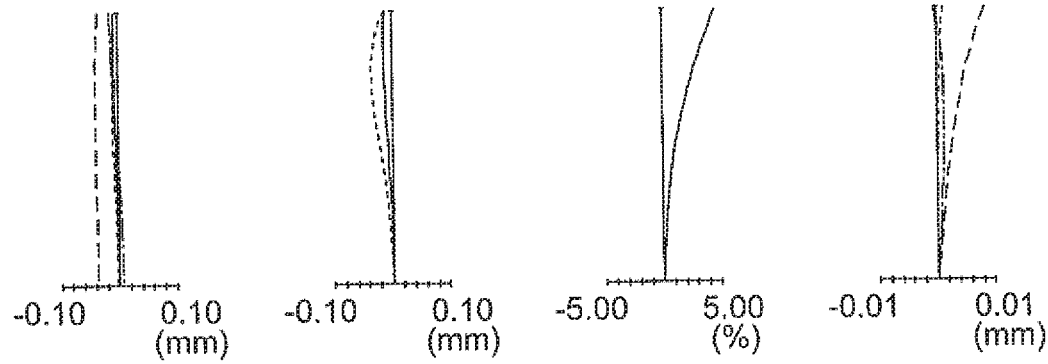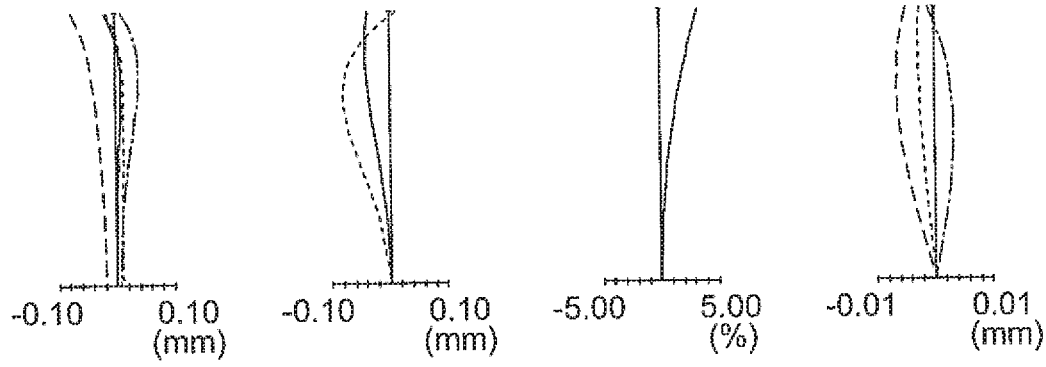

SA
FNO 1.756
-0.10  0.10
(mm)

AS
ω33.36
-0.10  0.10
(mm)

DT
ω33.36
-5.00  5.00
(%)

CC
ω33.36
-0.01  0.01
(mm)

SA
FNO 3.225
-0.10  0.10
(mm)

AS
ω6.21
-0.10  0.10
(mm)

DT
ω6.21
-5.00  5.00
(%)

CC
ω6.21
-0.01  0.01
(mm)

SA
FNO 3.900
-0.10  0.10
(mm)

AS
ω1.03
-0.10  0.10
(mm)

DT
ω1.03
-5.00  5.00
(%)

CC
ω1.03
-0.01  0.01
(mm)

VARIABLE MAGNIFICATION OPTICAL SYSTEM AND IMAGE PICKUP APPARATUS USING THE SAME

CROSS-REFERENCE TO RELATED APPLICATION

The present application is based upon and claims the benefit of priority from the prior Japanese Patent Application No. 2017-093100 filed on May 9, 2017; the entire contents of which are incorporated herein by reference.

BACKGROUND OF THE INVENTION

Field of the Invention

The present invention relates to a variable magnification optical system and an image pickup apparatus using the same.

Description of the Related Art

A variable magnification optical system having at least three lens units has been disclosed in Japanese Patent Application Laid-open Publication No. 2016-99549 (first example to fourth example). The variable magnification optical system of Japanese Patent Application Laid-open Publication No. 2016-99549 includes at least, a first lens unit having a positive refractive power, a second lens unit having a negative refractive power, and a third lens unit having a positive refractive power.

SUMMARY OF THE INVENTION

A variable magnification optical system according to at least some embodiments of the present invention having a plurality of lens elements, comprises in order form an object side;
  a first lens unit having a positive refractive power;
  a second lens unit having a negative refractive power;
  a third lens unit having a positive refractive power; and
  at least one lens unit, wherein
  an aperture stop is positioned between an image-side surface of the second lens unit and an image-side surface of the third lens unit, and
  at a time of zooming from a wide angle end to a telephoto end,
  the second lens unit moves from the object side to an image side, and
  at least one of the lens units positioned on the image side of the aperture stop moves, and
  a second predetermined positive lens element satisfies the following conditional expressions (1) and (2), and
  a second predetermined negative lens element satisfies the following conditional expressions (3) and (4), and
  the second lens unit includes in order from the object side, a first sub-lens unit having a negative refractive power, a second sub-lens unit having a negative lens element, and a third sub-lens unit having a negative lens element, and
  at least one of the second sub-lens unit and the third sub-lens unit includes a positive lens element, and
  the following conditional expression (5) and (6) are satisfied:

$$0.520 < (\theta g, F)G2p < 0.610 \quad (1),$$

$$0.680 < (\theta C, t)G2p < 0.900 \quad (2),$$

$$0.520 < (\theta g, F)G2n < 0.560 \quad (3),$$

$$0.750 < (\theta C, t)G2n < 0.900 \quad (4),$$

$$-0.25 < fG21/fG22 < 0.90 \quad (5), \text{ and}$$

$$-0.70 < fG21/fG23 < 0.40 \quad (6)$$

where,
  fG21 denotes a focal length of the first sub-lens unit,
  fG22 denotes a focal length of the second sub-lens unit,
  fG23 denotes a focal length of the third sub-lens unit,
  $(\theta g, F)$ G2p denotes a partial dispersion ratio of the second predetermined positive lens element,
  $(\theta C, t)$ G2p denotes a partial dispersion ratio of the second predetermined positive lens element,
  $(\theta g, F)$ G2n denotes a partial dispersion ratio of the second predetermined negative lens element,
  $(\theta C, t)$ G2n denotes a partial dispersion ratio of the second predetermined negative lens element, $$(\theta g, F) = (ng - nF)/(nF - nC),$$

$$(\theta C, t) = (nC - nt)/(nF - nC),$$

where,
  ng denotes a refractive index for a g-line,
  nF denotes a refractive index for an F-line,
  nC denotes a refractive index for a C-line,
  nt denotes a refractive index for a t-line, and
  the second predetermined positive lens element is all positive lens elements in the second lens unit,
  the second predetermined negative lens element is the negative lens element in the second sub-lens unit and the negative lens element in the third sub-lens unit, and
  the lens element is a lens having a medium of a refractive index higher than 1 filled between an object-side surface and an image-side surface, and having no refracting surface between the object-side surface and the image-side surface.

Moreover, an image pickup apparatus according to at least some embodiments of the present invention comprises;
  an optical system, and
  an image pickup element which has an image pickup surface, and which converts an image formed on the image pickup surface by the optical system to an electric signal, wherein
  the optical system is the abovementioned variable magnification optical system.

BRIEF DESCRIPTION OF THE DRAWINGS

FIG. 3A, FIG. 3B, and FIG. 3C are lens cross-sectional views at the time of focusing to an object at infinity, of a variable magnification optical system according to an example 3;

FIG. 7A, FIG. 7B, FIG. 7C, FIG. 7D, FIG. 7E, FIG. 7F, FIG. 7G, FIG. 7H, FIG. 7I, FIG. 7J, FIG. 7K, and FIG. 7L are aberration diagrams at the time of focusing to an object at infinity, of the variable magnification optical system according to the example 1;

FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L are aberration diagrams at the time of focusing to an object at infinity, of the variable magnification optical system according to the example 3;

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L are aberration diagrams at the time of focusing to an object at infinity, of the variable magnification optical system according to the example 5;

DETAILED DESCRIPTION OF THE INVENTION

Figure 1A:
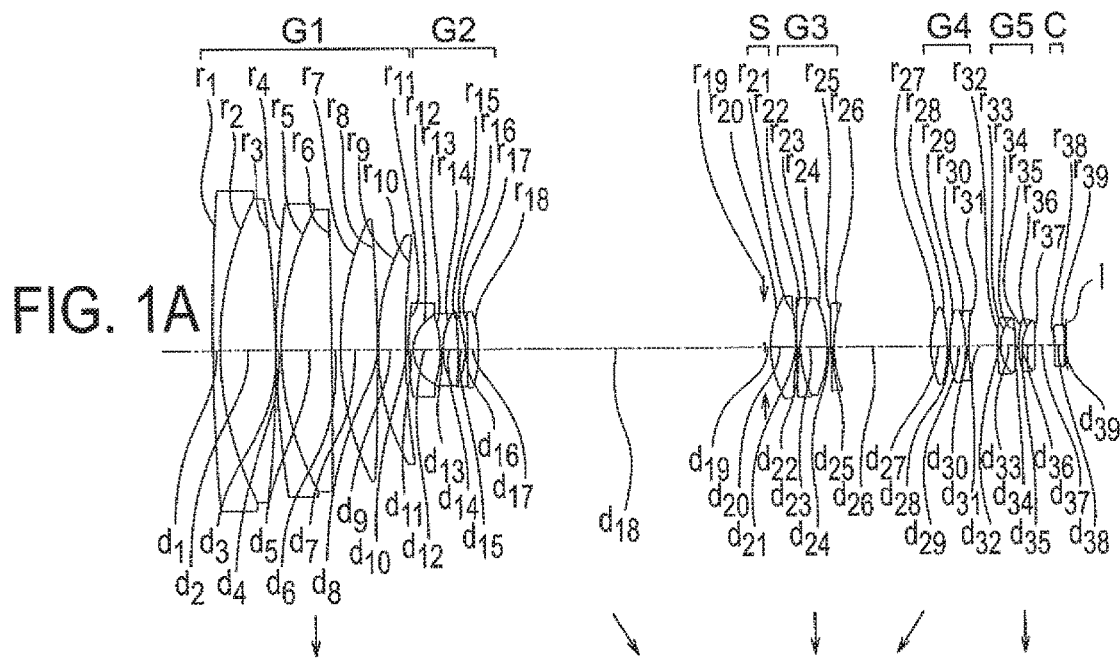
FIG. 1A, FIG. 1B, and FIG. 1C are lens cross-sectional views at the time of focusing to an object at infinity, of a variable magnification optical system according to an example 1.
Figure 1B:
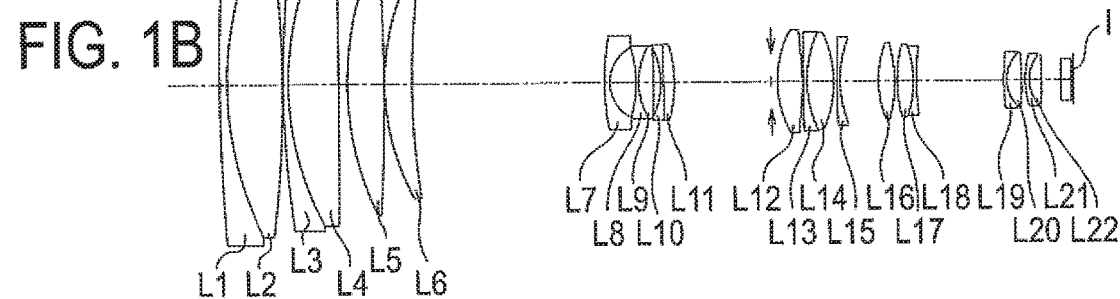
Figure 1C:
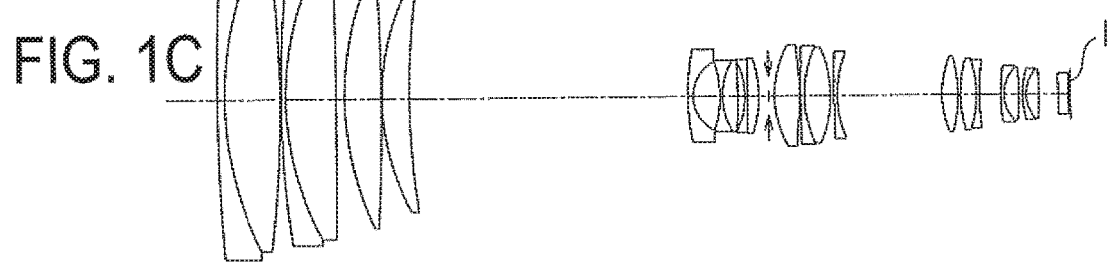
Figure 2A:
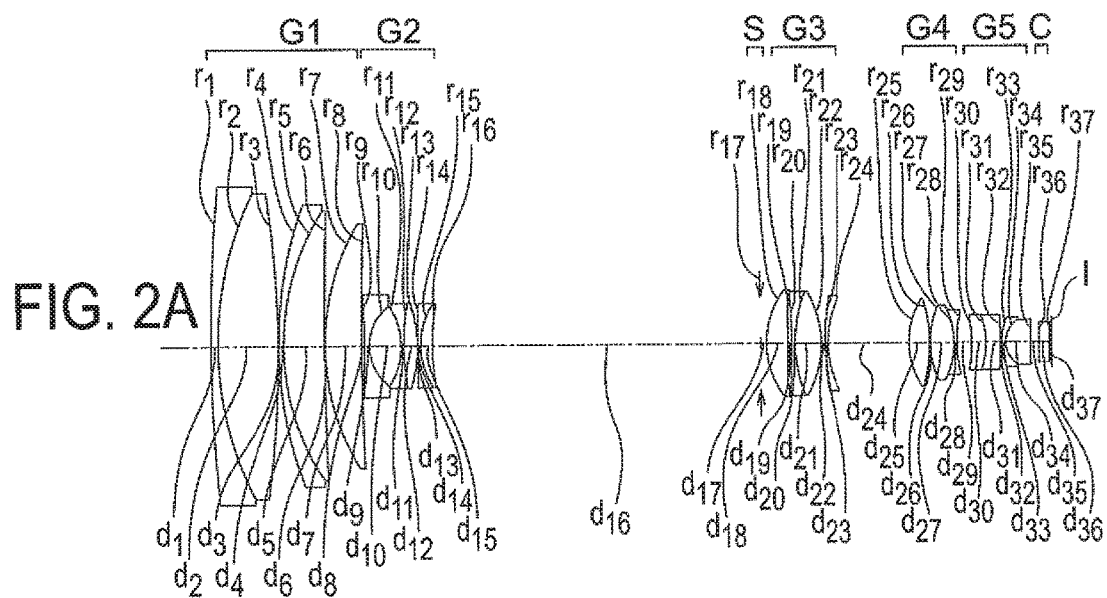
FIG. 2A, FIG. 2B, and FIG. 2C are lens cross-sectional views at the time of focusing to an object at infinity, of a variable magnification optical system according to an example 2.
Figure 2B:
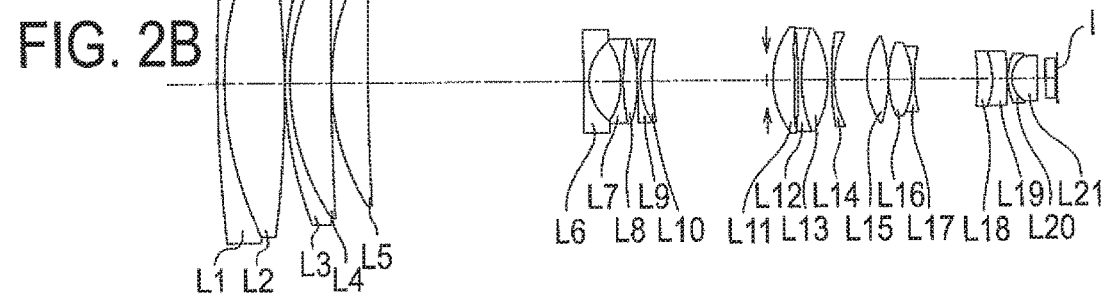
Figure 2C:
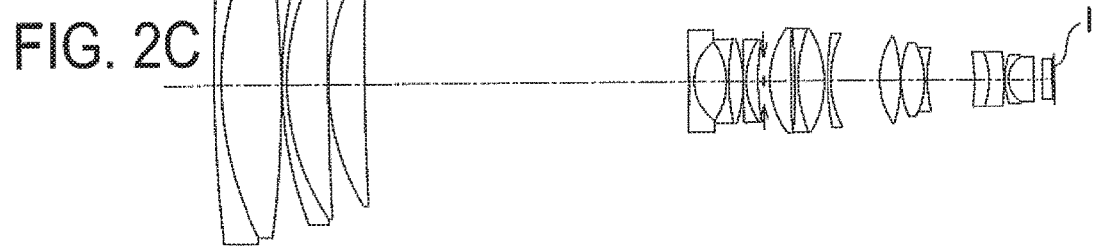
Figure 4A:
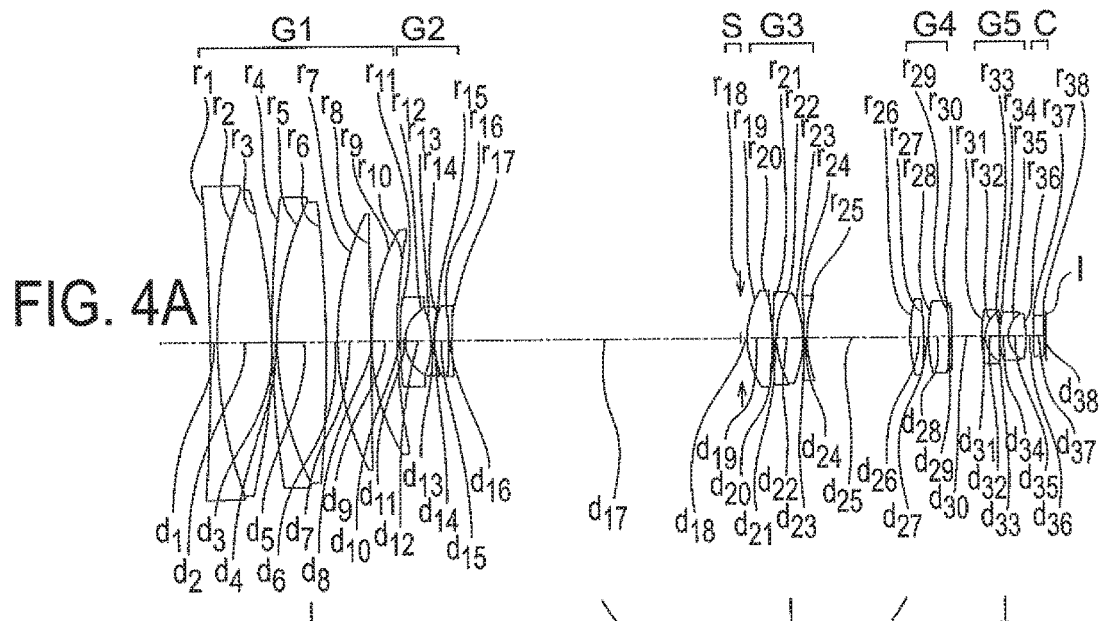
FIG. 4A, FIG. 4B, and FIG. 4C are lens cross-sectional views at the time of focusing to an object at infinity, of a variable magnification optical system according to an example 4.
Figure 4B:
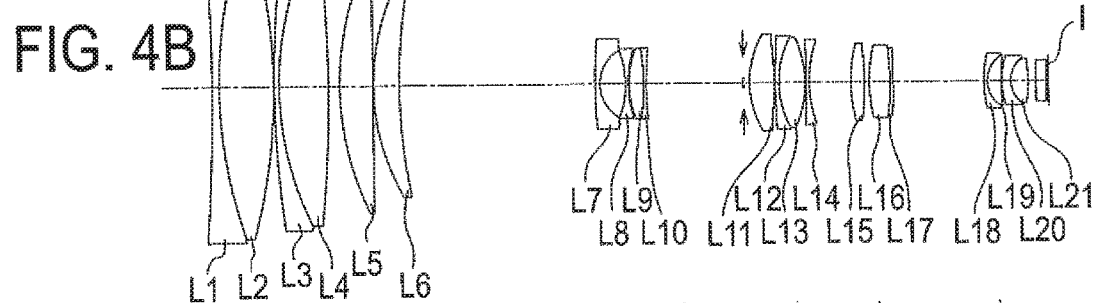
Figure 4C:
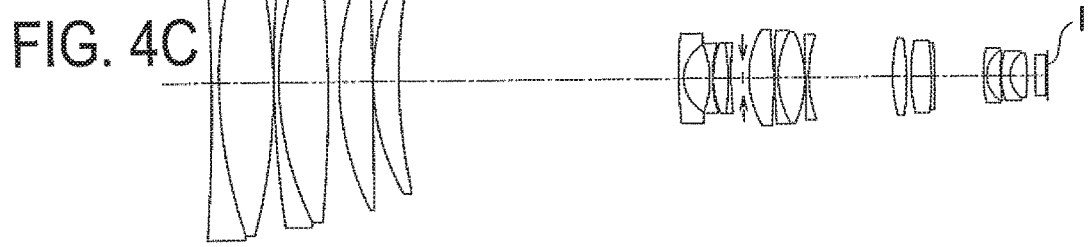
Figure 5A:
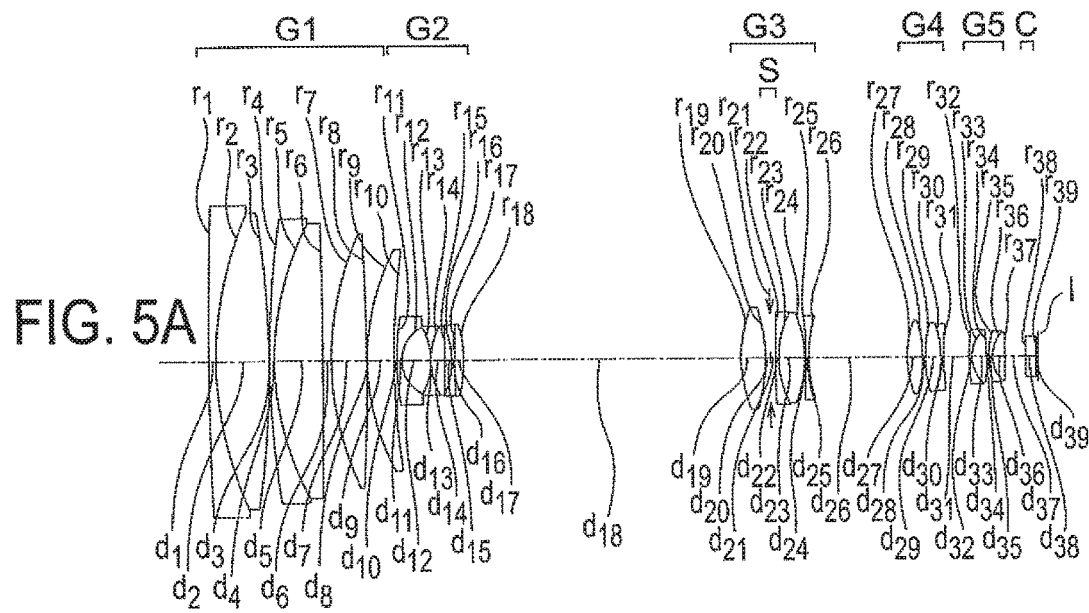
FIG. 5A, FIG. 5B, and FIG. 5C are lens cross-sectional views at the time of focusing to an object at infinity, of a variable magnification optical system according to an example 5.
Figure 5B:
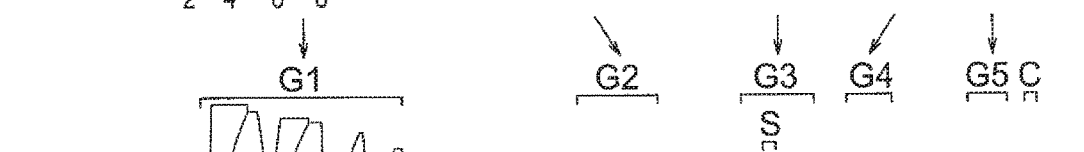
Figure 5C:
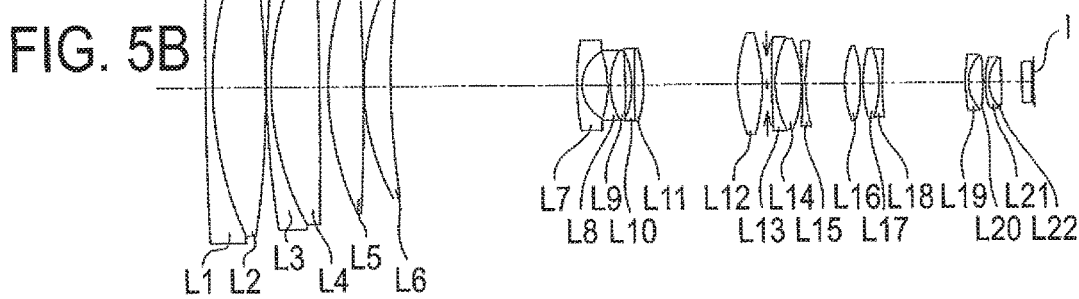
Figure 6A:
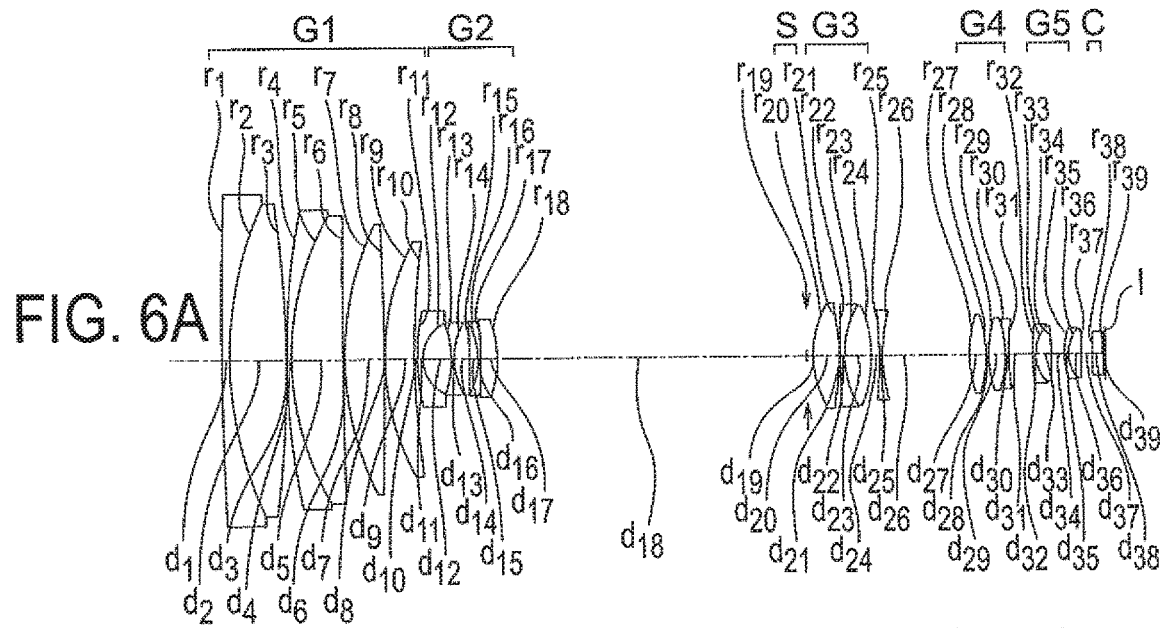
FIG. 6A, FIG. 6B, and FIG. 6C are lens cross-sectional views at the time of focusing to an object at infinity, of a variable magnification optical system according to an example 6.
Figure 6B:
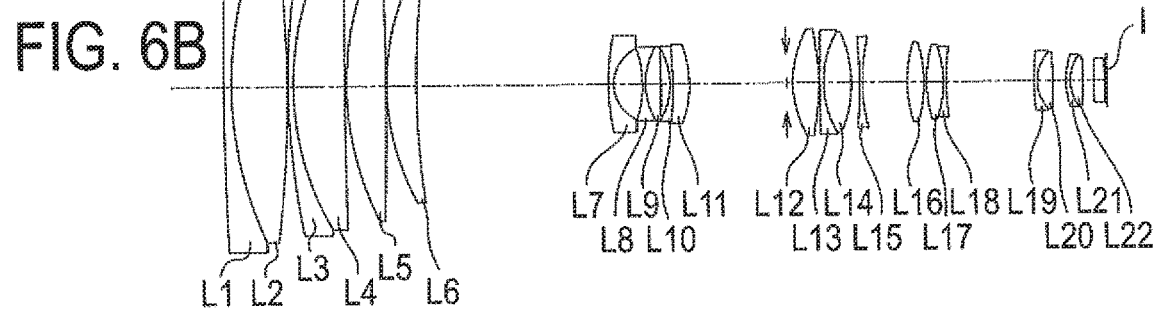
Figure 6C:
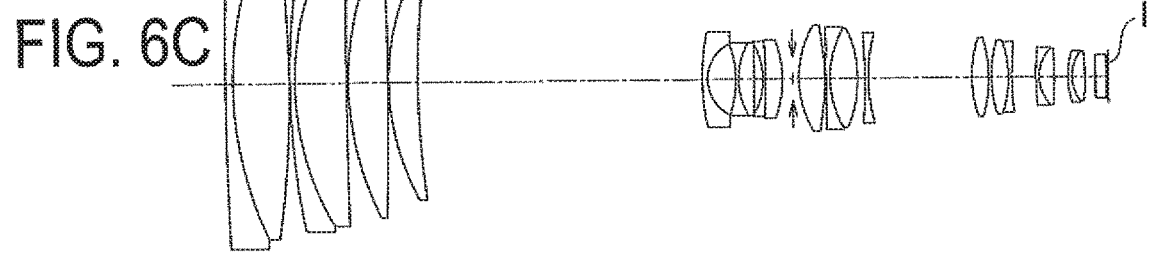
Figure 8A:
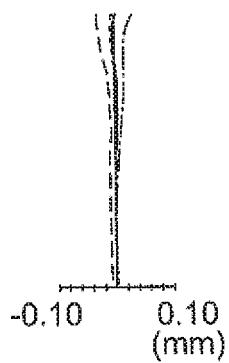
FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of focusing to an object at infinity, of the variable magnification optical system according to the example 2.
Figure 8B:
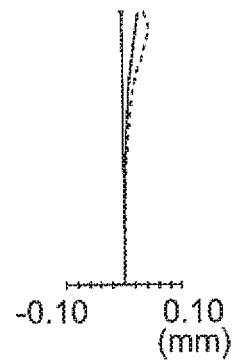
Figure 8C:
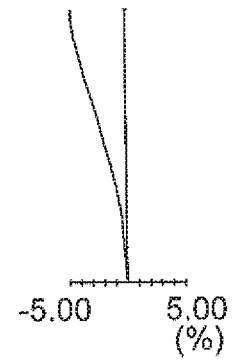
Figure 8D:
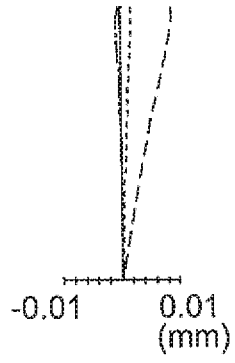
Figure 8E:
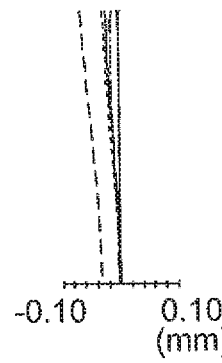
Figure 8F:
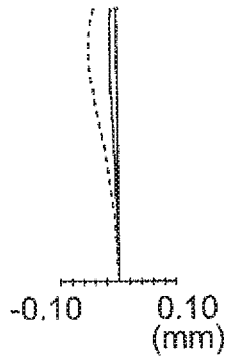
Figure 8G:
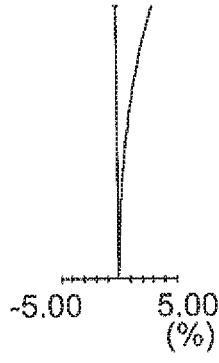
Figure 8H:
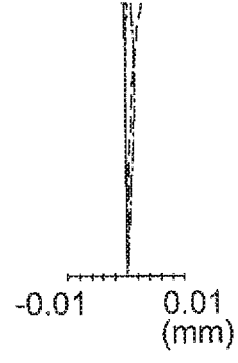
Figure 8I:
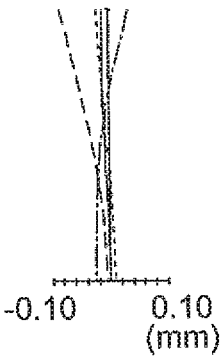
Figure 8J:
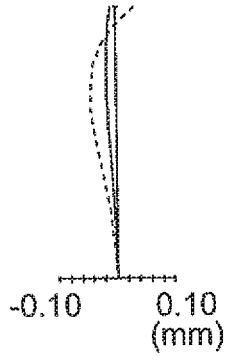
Figure 8K:
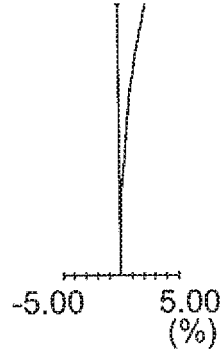
Figure 8L:
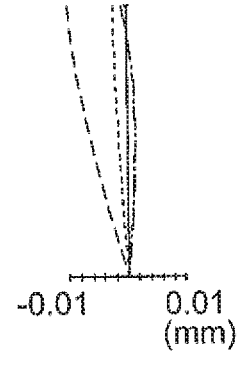
Figure 10A:
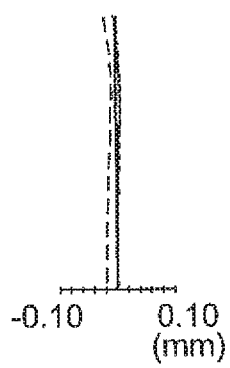
FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of focusing to an object at infinity, of the variable magnification optical system according to the example 4.
Figure 10B:
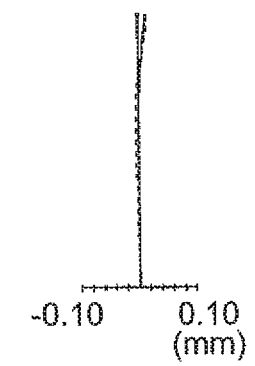
Figure 10C:
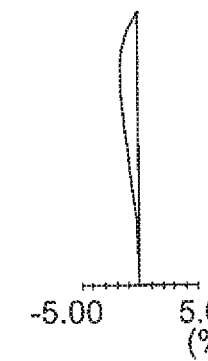
Figure 10D:
Figure 10E:
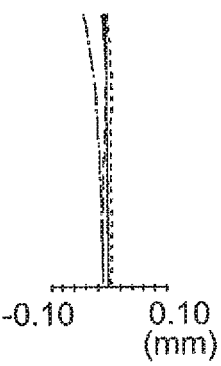
Figure 10F:
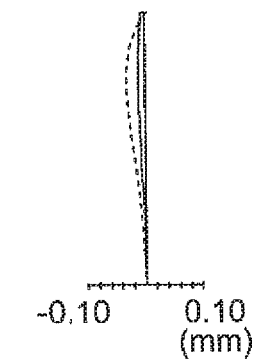
Figure 10G:
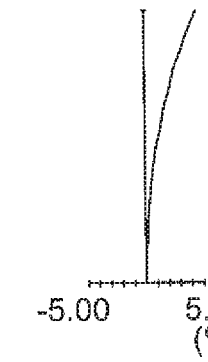
Figure 10H:
Figure 10I:
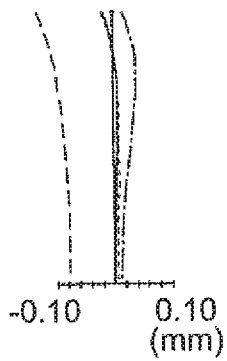
Figure 10J:
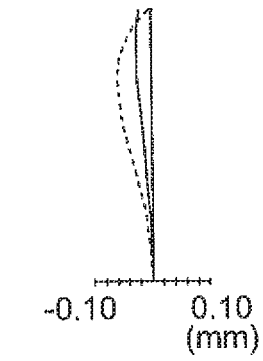
Figure 10K:
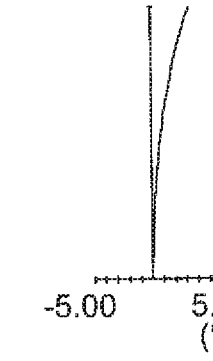
Figure 10L:
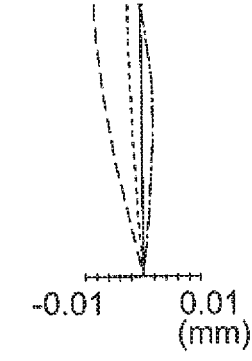
Figure 12A:
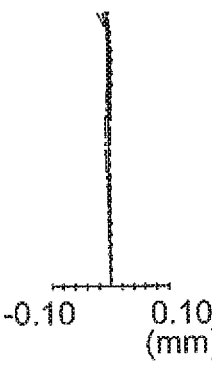
FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams at the time of focusing to an object at infinity of the variable magnification optical system according to the example 6.
Figure 12B:
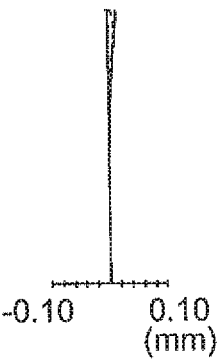
Figure 12C:
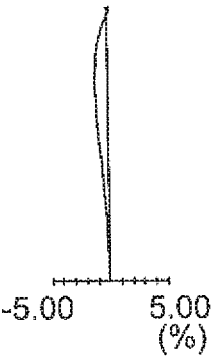
Figure 12D:
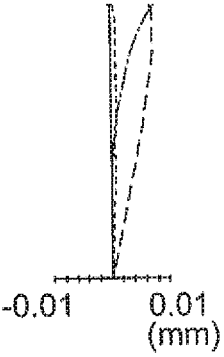
Figure 12E:
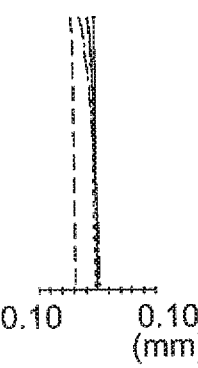
Figure 12F:
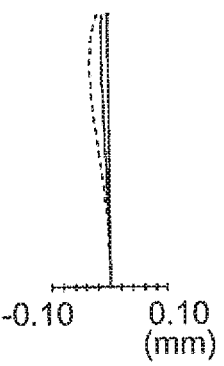
Figure 12G:
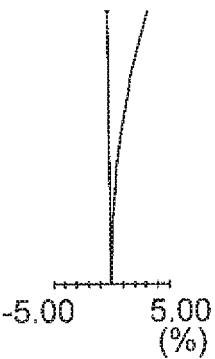
Figure 12H:
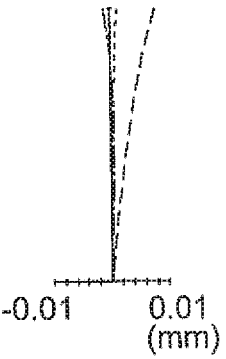
Figure 12I:
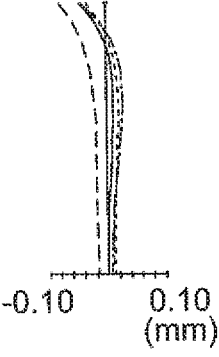
Figure 12J:
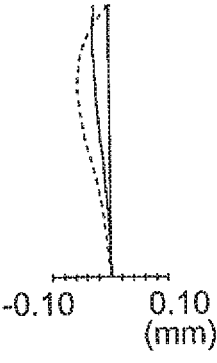
Figure 12K:
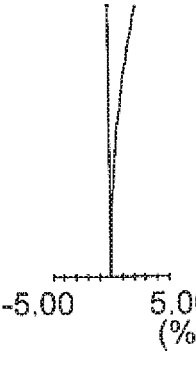
Figure 12L:
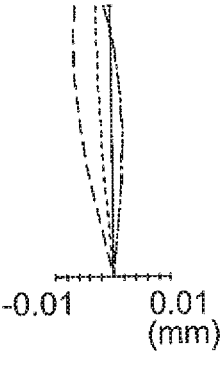

Prior to the explanation of examples, action and effect of embodiments according to certain aspects of the present invention will be described below. In the explanation of the action and effect of the embodiments concretely, the explanation will be made by citing concrete examples. However, similar to a case of the examples to be described later, aspects exemplified thereof are only some of the aspects included in the present invention, and there exists a large number of variations in these aspects. Consequently, the present invention is not restricted to the aspects that will be exemplified.

A variable magnification optical system according to the present embodiment having a plurality of lens elements, includes in order from an object side, a first lens unit having a positive refractive power, a second lens unit having a negative refractive power, a third lens unit having a positive refractive power, and at least one lens unit, wherein an aperture stop which determines an optical axial light beam is positioned between an image-side surface of the second lens unit and an image-side surface of the third lens unit, and at a time of zooming from a wide angle end to a telephoto end, the second lens unit moves from the object side to an image side, and at least one of the lens units positioned on the image side of the aperture stop moves, and a second predetermined positive lens element satisfies the following conditional expressions (1) and (2), and a second predetermined negative lens element satisfies the following conditional expressions (3) and (4), and the second lens unit includes in order from the object side, a first sub-lens unit having a negative refractive power, a second sub-lens unit having a negative lens element, and a third sub-lens unit having a negative lens element, and at least one of the second sub-lens element and the third sub-lens element includes a positive lens element, and the following conditional expressions (5) and (6) are satisfied:

$$0.520 < (\theta g, F)G2p < 0.610 \quad (1),$$

$$0.680 < (\theta C, t)G2p < 0.900 \quad (2),$$

$$0.520 < (\theta g, F)G2n < 0.560 \quad (3),$$

$$0.750 < (\theta C, t)G2n < 0.900 \quad (4),$$

$$-0.25 < fG21/fG22 < 0.90 \quad (5), \text{ and}$$

$$-0.70 < fG21/fG23 < 0.40 \quad (6)$$

where, fG21 denotes a focal length of the first sub-lens unit,
fG22 denotes a focal length of the second sub-lens unit,
fG23 denotes a focal length of the third sub-lens unit,
($\theta$g, F) G2p denotes a partial dispersion ratio of the second predetermined positive lens element,
($\theta$C, t) G2p denotes a partial dispersion ratio of the second predetermined positive lens element,
($\theta$g, F) G2n denotes a partial dispersion ratio of the second predetermined negative lens element,
($\theta$C, t) G2n denotes a partial dispersion ratio of the second predetermined negative lens element, $$(\theta g, F) = (ng - nF)/(nF - nC),$$

$$(\theta C, t) = (nC - nt)/(nF - nC),$$

where, ng denotes a refractive index for a g-line,
nF denotes a refractive index for an F-line,
nC denotes a refractive index for a C-line,
nt denotes a refractive index for a t-line, and
the second predetermined positive lens element is all positive lens elements in the second lens unit,
the second predetermined negative lens element is the negative lens element in the second sub-lens unit and the negative lens element in the third sub-lens unit, and
the lens element is a lens having a medium of a refractive index higher than 1 filled between an object-side surface and an image-side surface, and having no refracting surface between the object-side surface and the image-side surface.

The variable magnification optical system according to the present embodiment has a plurality of lens elements, and includes in order from the object side, the first lens unit having a positive refractive power, the second lens unit having a negative refractive power, and the third lens unit having a positive refractive power.

In the variable magnification optical system of the present embodiment, the type of the optical system is let to be a positive-lead type. By letting the optical system to be of the positive-lead type, it is possible to secure a high zooming ratio and a small F-number from the wide angle end up to the telephoto end. Moreover, it is possible to make a lens unit on the image side of the third lens unit small-sized, while maintaining a small F-number.

At least one lens unit is disposed on the image side of the third lens unit. By making such arrangement, it is possible to correct favorably an off-axis aberration on wide angle side, specifically, an astigmatism and a chromatic aberration of magnification occurring in the first lens unit and the second lens unit.

The aperture stop is disposed between the image-side surface of the second lens unit and the image-side surface of the third lens unit. By making such arrangement, it is possible to suppress a diameter of an axial light beam in the third lens unit and a diameter of an axial light beam on the image side of the third lens unit.

At the time of zooming, the second lens unit moves. Principal zooming is carried out by the movement of the second lens unit. An image plane fluctuates with the zooming. Correction of the image-plane fluctuation is carried out at a lens positioned on the image side of the aperture stop.

The third lens unit and at least one lens unit are disposed on the image side of the aperture stop. As mentioned above, the diameter of the axial light beam is suppressed in the third lens unit and on the image side of the third lens unit. Therefore, by moving the lens unit positioned between the aperture stop and the image plane, it is possible to correct the image-plane fluctuation while suppressing a fluctuation in a spherical aberration and a fluctuation in the longitudinal chromatic aberration at the time of zooming.

Furthermore, the second predetermined positive lens element satisfies the conditional expressions (1) and (2), and the second predetermined negative lens element satisfies the conditional expressions (3) and (4).

Conditional expression (1) is a conditional expression of the partial dispersion ratio of the second predetermined positive lens element for the g-line and the F-line. Conditional expression (2) is a conditional expression of the partial dispersion ratio of the second predetermined positive lens element for the C-line and the t-line. The second predetermined positive lens element is all the positive lens elements in the second lens unit.

Conditional expression (3) is a conditional expression of the partial dispersion ratio of the second predetermined negative lens element for the g-lien and the F-line, and conditional expression (4) is a conditional expression of the partial dispersion ratio of the second predetermined negative lens element for the C-line and the t-line. The second predetermined negative lens element is a negative lens element in the second sub-lens unit and a negative lens element in the third sub-lens unit.

The partial dispersion ratio for the g-line and the F-line is expressed by the following expression (A), and the partial dispersion ratio for the C-line and the t-line is expressed by the following expression (B).

$$(\theta g, F) = (ng - nF)/(nF - nC) \tag{A}$$

$$(\theta C, t) = (nC - nt)/(nF - nC) \tag{B}$$

The chromatic aberration of magnification at the wide angle end occurs mainly in the second lens unit. Therefore, it is preferable to suppress an occurrence of the chromatic aberration of magnification by the second lens unit independently. For this, a glass material having an appropriate partial dispersion ratio for correction of the chromatic aberration of magnification is to be used for the lens elements in the second lens unit.

The second predetermined positive lens element and the second predetermined negative lens element are disposed in the second lens unit. By satisfying conditional expressions (1), (2), (3), and (4), a glass material having an appropriate partial dispersion ratio is used for the glass material of the positive lens element and the glass material of the negative lens element.

The second lens unit includes in order from the object side, the first sub-lens unit having a negative refractive power, the second sub-lens unit having a negative lens element, and the third sub-lens unit having a negative lens element. At least one of the second sub-lens unit and the third sub-lens unit includes the positive lens element.

By making such arrangement, it is possible to suppress an amount of the chromatic aberration of magnification that occurs at the wide angle end, in a balanced manner over a wide wavelength region. The wide wavelength region is a wavelength region from the g-line (435.84 nm) up to the C-line (643.85 nm), and furthermore, up to the t-line (1013.98 nm), for example.

As described above, according to the variable magnification optical system of the present embodiment, from a visible range up to a near infra-red region in particular, it is possible to realize a high magnification optical system in which a chromatic aberration is corrected favorably. Moreover, it is possible to correct the chromatic aberration of magnification at the wide angle end in particular, in a balanced manner from a vicinity of the g-line up to the near infra-red region.

It is preferable that the following conditional expression (1') be satisfied instead of conditional expression (1).

$$0.530 < (\theta g, F)G2p < 0.600 \tag{1'}$$

It is more preferable that the following conditional expression (1") be satisfied instead of conditional expression (1).

$$0.535 < (\theta g, F)G2p < 0.590 \tag{1"}$$

It is preferable that the following conditional expression (2') be satisfied instead of conditional expression (2).

$$0.700 < (\theta C, t)G2p < 0.880 \tag{2'}$$

It is more preferable that the following conditional expression (2") be satisfied instead of conditional expression (2).

$$0.720 < (\theta C, t)G2p < 0.870 \tag{2"}$$

It is preferable that the following conditional expression (3') be satisfied instead of conditional expression (3).

$$0.525 < (\theta g, F)G2n < 0.550 \tag{3'}$$

It is more preferable that the following conditional expression (3") be satisfied instead of conditional expression (3).

$$0.530 < (\theta g, F)G2n < 0.540 \tag{3"}$$

It is preferable that the following conditional expression (4') be satisfied instead of conditional expression (4).

$$0.800 < (\theta C, t)G2n < 0.880 \tag{4'}$$

It is more preferable that the following conditional expression (4") be satisfied instead of conditional expression (4).

$$0.820 < (\theta C, t)G2n < 0.850 \tag{4"}$$

It is preferable that the following conditional expression (5') be satisfied instead of conditional expression (5).

$$-0.15 < fG21/fG22 < 0.70 \quad (5')$$

It is more preferable that the following conditional expression (5") be satisfied instead of conditional expression (5).

$$-0.10 < fG21/fG22 < 0.20 \quad (5'')$$

It is preferable that the following conditional expression (6') be satisfied instead of conditional expression (6).

$$-0.55 < fG21/fG23 < 0.20 \quad (6')$$

It is more preferable that the following conditional expression (6") be satisfied instead of conditional expression (6).

$$-0.10 < fG21/fG23 < 0.10 \quad (6'')$$

In the variable magnification optical system of the present embodiment, it is preferable that the first lens unit include at least three positive lens elements and at least two negative lens elements.

By disposing at least three positive lens elements in the first lens unit, it is possible to let the refractive power of the first lens unit to be shared by a plurality of lens elements. Consequently, it is possible to make the refractive power of the first lens unit large while suppressing an occurrence of the spherical aberration, an occurrence of the astigmatism, an occurrence of the longitudinal chromatic aberration, and an occurrence of the chromatic aberration of magnification at the telephoto end side. As a result, it is possible to achieve a high zoom ratio while shortening the overall length of the optical system and small-sizing of a diameter of the first lens unit.

By disposing at least two negative lens elements in the first lens unit, it is possible to correct favorably the longitudinal chromatic aberration and the chromatic aberration of magnification at the telephoto side, without letting the spherical aberration at the telephoto side to be deteriorated.

In the variable magnification optical system of the present embodiment, it is preferable that the first lens unit be fixed at the time of zooming.

By letting the first lens unit to be fixed all the time with respect to the image plane, it is possible to reduce a manufacturing error and to simplify a zoom arrangement.

In the variable magnification optical system of the present embodiment, it is preferable that the following conditional expression (7) be satisfied:

$$1.10 < |fG1/d2G| < 1.50 \quad (7)$$

where, fG1 denotes a focal length of the first lens unit, and d2G denotes an amount of movement of the second lens unit from the wide angle end up to the telephoto end.

Conditional expression (7) is a conditional expression in which a ratio of the focal length of the first lens unit and the amount of movement of the second lens unit from the wide angle end up to the telephoto end is taken.

When a value exceeds a lower limit value of conditional expression (7), it is possible to make the focal length of the first lens unit long with respect to the amount of movement of the second lens unit, or in other words, to make the refractive power of the first lens unit small. Consequently, it is possible to suppress an occurrence of various aberrations in the first lens unit, and particularly an occurrence of the longitudinal chromatic aberration, an occurrence of the chromatic aberration of magnification, and an occurrence of the spherical aberration in the first lens unit at the telephoto end.

When the value falls below an upper limit value of conditional expression (7), it is possible to make the focal length of the first lens unit short with respect to the amount of movement of the second lens unit, or in other words, to make the refractive power of the first lens unit large. In this case, since it is possible to suppress the amount of movement of the second lens unit at the time of zooming, it is possible to shorten the overall length of the optical system.

It is more preferable that the following conditional expression (7') be satisfied instead of conditional expression (7).

$$1.20 < |fG1/d2G| < 1.45 \quad (7')$$

It is even more preferable that the following conditional expression (7") be satisfied instead of conditional expression (7).

$$1.25 < |fG1/d2G| < 1.40 \quad (7'')$$

In the variable magnification optical system of the present embodiment, it is preferable that the following conditional expression (8) be satisfied:

$$1.60 < |fG2/fw| < 2.80 \quad (8)$$

where, fG2 denotes a focal length of the second lens unit, and fw denotes a focal length of the overall variable magnification optical system at the wide angle end.

Conditional expression (8) is an expression in which a ratio of the focal length of the second lens unit and the focal length of the overall variable magnification optical system at the wide angle end is taken.

When a value exceeds a lower limit value of conditional expression (8), it is possible to make the focal length of the second lens unit long with respect to the focal length of the overall variable magnification optical system at the wide angle end, or in other words, to make the refractive power of the second lens unit small. Consequently, it is possible to suppress an occurrence of various aberrations in the second lens unit, and particularly an occurrence of a distortion, an occurrence of the astigmatism, and an occurrence of the chromatic aberration of magnification at the wide angle end. As a result, it is possible to maintain a favorable imaging performance.

When the value falls below an upper limit value of conditional expression (8), it is possible to make the focal length of the second lens unit short with respect to the focal length of the overall variable magnification optical system at the wide angle end, or in other words, to make the refractive power of the second lens unit large. In this case, a position of an entrance pupil at the wide angle end is brought further closer to object. Consequently, it is possible to make small a diameter of the first lens unit, and particularly, a diameter of a lens element positioned nearest to object.

It is more preferable that the following conditional expression (8') be satisfied instead of conditional expression (8).

$$1.80 < |fG2/fw| < 2.60 \quad (8')$$

It is even more preferable that the following conditional expression (8") be satisfied instead of conditional expression (8).

$$1.90 < |fG2/fw| < 2.50 \quad (8'')$$

In the variable magnification optical system of the present embodiment, it is preferable that the following conditional expression (9) be satisfied:

$$0.030<|fG2/ft|<0.100 \quad (9)$$

where, fG2 denotes the focal length of the second lens unit, and ft denotes a focal length of the overall variable magnification optical system at the telephoto end.

Conditional expression (9) is a conditional expression in which a ratio of the focal length of the second lens unit and the focal length of the overall variable magnification optical system at the telephoto end is taken.

When a value exceeds a lower limit value of conditional expression (9), it is possible to make the focal length of the second lens unit long with respect to the focal length of the overall variable magnification optical system at the telephoto end, or in other words, to make the refractive power of the second lens unit small. Consequently, it is possible to suppress a fluctuation in astigmatism at the time of zooming, near the telephoto end. As a result, it is possible to maintain a favorable imaging performance.

The first lens unit has a positive refractive power and the second lens unit has a negative refractive power. Therefore, by the positive refractive power of the first lens unit and the negative refractive power of the second lens unit, an effect peculiar to a telephoto optical system (hereinafter, referred to as 'telephoto effect') is achieved.

When the value falls below an upper limit value of conditional expression (9), it is possible to make the focal length of the second lens unit short with respect to the focal length of the overall variable magnification optical system at the telephoto end, or in other words, to make the refractive power of the second lens unit large. Consequently, it is possible to enhance the telephoto effect. As a result, it is possible to shorten the overall length of the optical system.

It is more preferable that the following conditional expression (9') be satisfied instead of conditional expression (9).

$$0.040<|fG2/ft|<0.090 \quad (9')$$

It is even more preferable that the following conditional expression (9") be satisfied instead of conditional expression (9).

$$0.050<|fG2/ft|<0.085 \quad (9'')$$

In the variable magnification optical system of the present embodiment, it is preferable that at least one lens unit includes a fourth lens unit having a positive refractive power, and a fifth lens unit.

By disposing the fourth lens unit having a positive refractive power on the image side of the third lens unit, it is possible to shorten a distance from the fourth lens unit up to the image plane.

By disposing the firth lens unit nearest to image, at the wide angle end, it is possible to correct more favorably the astigmatism and the chromatic aberration of magnification occurred between the first lens unit and the fourth lens unit, without letting the longitudinal chromatic aberration and the spherical aberration to be deteriorated.

In the variable magnification optical system of the present embodiment, it is preferable that a first predetermined positive lens element satisfy the following conditional expressions (10) and (11), and a first predetermined negative lens element satisfies the following conditional expressions (12) and (13):

$$0.520<(\theta g,F)G1p<0.560 \quad (10),$$

$$0.780<(\theta C,t)G1p<0.90 \quad (11),$$

$$0.520<(\theta g,F)G1n<0.560 \quad (12), \text{ and}$$

$$0.780<(\theta C,t)G1n<0.90 \quad (13)$$

where, ($\theta$g, F) G1p denotes a partial dispersion ratio of the first predetermined positive lens element, ($\theta$C, t) G1p denotes a partial dispersion ratio of the first predetermined positive lens element, ($\theta$g, F) G1n denotes a partial dispersion ratio of the first predetermined negative lens element, ($\theta$C, t) G1n denotes a partial dispersion ratio of the first predetermined negative lens element, the first predetermined positive lens element is all positive lens elements in the first lens unit, and the first predetermined negative lens element is all negative lens elements in the first lens unit.

Conditional expression (10) is a conditional expression of the partial dispersion ratio of the first predetermined positive lens element for the g-line and the F-line. Conditional expression (11) is a conditional expression of the partial dispersion ratio of the first predetermined positive lens element for the C-line and the t-line. The first predetermined positive lens element is all the positive lens elements in the first lens unit.

Conditional expression (12) is a conditional expression of the partial dispersion ratio of the first predetermined negative lens element for the g-lien and the F-line, and conditional expression (13) is a conditional expression of the partial dispersion ratio of the first predetermined negative lens element for the C-line and the t-line. The first predetermined negative lens element is all negative lens elements in the first lens unit.

When a value exceeds a lower limit value of conditional expression (10), the partial dispersion ratio of the first predetermined positive lens element for the g-line and the F-line becomes large. Consequently, it is possible to select a glass material to be used for the first predetermined positive lens element in a range of existing glass materials.

When the value falls below an upper limit value of conditional expression (10), the partial dispersion ratio of the first predetermined positive lens element for the g-line and the F-line becomes small. In this case, it is possible to suppress an occurrence of an aberration of the g-line with respect to the F-line, and particularly, an occurrence of the longitudinal chromatic aberration and an occurrence of the chromatic aberration of magnification at the telephoto side.

When a value exceeds a lower limit value of conditional expression (11), the partial dispersion ratio of the first predetermined positive lens element for the C-line and the t-line becomes large. In this case, it is possible to use a low-dispersion glass material (glass material for which Abbe number is large) for the material of the first predetermined positive lens element. Consequently, it is possible to suppress an occurrence of an aberration of the t-line with respect to the C-line, and particularly, an occurrence of the longitudinal chromatic aberration and an occurrence of the of the chromatic aberration of magnification, while suppressing an occurrence of the longitudinal chromatic aberration and an occurrence of the chromatic aberration of magnification at the telephoto side, with respect to the F-line and the C-line.

When the value falls below an upper limit value of conditional expression (11), the partial dispersion ratio of the first predetermined positive lens element for the C-line and the t-line becomes small. Consequently, it is possible to suppress an occurrence of an aberration of the t-line with respect to the C-line, and particularly, an occurrence of the longitudinal chromatic aberration and an occurrence of the chromatic aberration of magnification at the telephoto side.

When a value exceeds a lower limit value of conditional expression (12), the partial dispersion ratio of the first predetermined negative lens element for the g-line and the F-line becomes large. In this case, it is possible to make the refractive index of the first predetermined negative lens element large. As a result, it is possible to correct the spherical aberration at the telephoto side favorably.

When the value falls below an upper limit value of conditional expression (12), the partial dispersion ratio of the first predetermined negative lens element for the g-line and the F-line becomes small. In this case, it is possible to bring the partial dispersion ratio of the first predetermined negative lens element for the g-line and the F-line closer to the partial dispersion ratio of the first predetermined positive lens element for the g-line and the F-line. As a result, it is possible to correct favorably an aberration of the g-line with respect to the F-line, and particularly, the longitudinal chromatic aberration and the chromatic aberration of magnification at the telephoto side.

When a value exceeds a lower limit value of conditional expression (13), the partial dispersion ratio of the first predetermined negative lens element for the C-line and the t-line becomes large. In this case, it is possible to bring the partial dispersion ratio of the first predetermined negative lens element for the C-line and the t-line closer to the partial dispersion ratio of the first predetermined positive lens element for the C-line and the t-line. As a result, it is possible to correct favorably an aberration of the t-line with respect to the C-line, and particularly, the longitudinal chromatic aberration and the chromatic aberration of magnification at the telephoto side.

When the value falls below an upper limit value of conditional expression (13), the partial dispersion ratio of the first predetermined negative lens element for the C-line and the t-line becomes small. In this case, it is possible to make the refractive index of the first predetermined negative lens element large. As a result, it is possible to correct the spherical aberration at the telephoto side favorably.

It is more preferable that the following conditional expression (10') be satisfied instead of conditional expression (10).

$$0.525<(\theta g,F)G1p<0.550 \tag{10'}$$

It is even more preferable that the following conditional expression (10") be satisfied instead of conditional expression (10).

$$0.530<(\theta g,F)G1p<0.540 \tag{10"}$$

It is more preferable that the following conditional expression (11') be satisfied instead of conditional expression (11).

$$0.800<(\theta C,t)G1p<0.880 \tag{11'}$$

It is even more preferable that the following conditional expression (11") be satisfied instead of conditional expression (11).

$$0.820<(\theta C,t)G1p<0.850 \tag{11"}$$

It is more preferable that the following conditional expression (12') be satisfied instead of conditional expression (12).

$$0.530<(\theta g,F)G1n<0.555 \tag{12'}$$

It is even more preferable that the following conditional expression (12") be satisfied instead of conditional expression (12).

$$0.536<(\theta g,F)G1n<0.550 \tag{12"}$$

It is more preferable that the following conditional expression (13') be satisfied instead of conditional expression (13).

$$0.790<(\theta C,t)G1n<0.88 \tag{13'}$$

It is even more preferable that the following conditional expression (13") be satisfied instead of conditional expression (13).

$$0.800<(\theta C,t)G1n<0.87 \tag{13"}$$

In the variable magnification optical system of the present embodiment, it is preferable that the second lens unit include an object-side negative lens element, and the object-side negative lens element be positioned nearest to object, and the following conditional expressions (14) and (15) be satisfied:

$$0.530<(\theta g,F)G2nf<0.580 \tag{14), and}$$

$$0.720<(\theta C,t)G2nf<0.860 \tag{15}$$

where, ($\theta$g, F) G2nf denotes a partial dispersion ratio of the object-side negative lens element, and ($\theta$C, t) G2nf denotes a partial dispersion ratio of the object-side negative lens element.

It is more preferable that the following conditional expression (14') be satisfied instead of conditional expression (14).

$$0.535<(\theta g,F)G2nf<0.570 \tag{14'}$$

It is even more preferable that the following conditional expression (14") be satisfied instead of conditional expression (14).

$$0.540<(\theta g,F)G2nf<0.560 \tag{14"}$$

It is more preferable that the following conditional expression (15') be satisfied instead of conditional expression (15).

$$0.760<(\theta C,t)G2nf<0.840 \tag{15'}$$

It is even more preferable that the following conditional expression (15") be satisfied instead of conditional expression (15).

$$0.780<(\theta C,t)G2nf<0.830 \tag{15"}$$

Conditional expression (14) is a conditional expression of the partial dispersion ratio of the object-side negative lens element for the g-line and the F-line. Conditional expression (15) is a conditional expression of the partial dispersion ratio of the object-side negative lens element for the C-line and the t-line.

When a value exceeds a lower limit value of conditional expression (14), the partial dispersion ratio of the object-side negative lens element for the g-line and the F-line becomes large. In this case, it is possible to make the refractive index of the object-side negative lens element large. As a result, it is possible to correct favorably the astigmatism and a curvature of field at the wide angle side.

When the value falls below an upper limit value of conditional expression (14), the partial dispersion ratio of the object-side negative lens element for the g-line and the F-line becomes small. Consequently, it is possible to suppress an occurrence of an aberration of the g-line with respect to the F-line, and particularly, an occurrence of the chromatic aberration of magnification at the wide angle end.

When a value exceeds a lower limit value of conditional expression (15), the partial dispersion ratio of the object-side negative lens element for the C-line and the t-line becomes large. In this case, it is possible to use a low-dispersion glass material (glass material for which Abbe number is large) for the material of the object-side negative lens element. Consequently, it is possible to correct an aberration of the t-line with respect to the C-line, and particularly, the chromatic aberration of magnification favorably, while suppressing an occurrence of the chromatic aberration of magnification at the wide angle end, with respect to the F-line and the C-line.

When the value falls below an upper limit value of conditional expression (15), the partial dispersion ratio of the object-side negative lens element for the C-line and the t-line becomes small. Consequently, it is possible to suppress an occurrence of an aberration of the t-line with respect to the C-line, and particularly an occurrence of the chromatic aberration of magnification at the wide angle end.

In the variable magnification optical system of the present embodiment, it is preferable that a third predetermined positive lens element satisfy the following conditional expressions (16) and (17), and a third predetermined negative lens element satisfies the following conditional expressions (18) and (19):

$$0.520<(\theta g, F)G3p<0.560 \quad (16),$$

$$0.780<(\theta C, t)G3p<0.90 \quad (17),$$

$$0.520<(\theta g, F)G3n<0.560 \quad (18), \text{ and}$$

$$0.780<(\theta C, t)G3n<0.90 \quad (19)$$

where, ($\theta g$, F) G3p denotes a partial dispersion ratio of the third predetermined positive lens element, ($\theta C$, t) G3p denotes a partial dispersion ratio of the third predetermined positive lens element, ($\theta g$, F) G3n denotes a partial dispersion ratio of the third predetermined negative lens element, ($\theta C$, t) G3n denotes a partial dispersion ratio of the third predetermined negative lens element, the third predetermined positive lens element is all positive lens elements in the third lens unit, and the third predetermined negative lens element is all negative lens elements in the third lens unit.

Conditional expression (16) is a conditional expression of the partial dispersion ratio of the third predetermined positive lens element for the g-line and the F-line. Conditional expression (17) is a conditional expression of the partial dispersion ratio of the third predetermined positive lens element for the C-line and the t-line. The third predetermined positive lens element is all the positive lens elements in the first lens unit.

Conditional expression (18) is a conditional expression of the partial dispersion ratio of the third predetermined negative lens element for the g-lien and the F-line, and conditional expression (19) is a conditional expression of the partial dispersion ratio of the third predetermined negative lens element for the C-line and the t-line. The third predetermined negative lens element is all negative lens elements in the first lens unit.

When a value exceeds a lower limit value of conditional expression (16), the partial dispersion ratio of the third predetermined positive lens element for the g-line and the F-line becomes large. Consequently, it is possible to select a glass material to be used for the third predetermined positive lens element in a range of existing glass materials.

When the value falls below an upper limit value of conditional expression (16), the partial dispersion ratio of the third predetermined positive lens element for the g-line and the F-line becomes small. In this case, it is possible to suppress an occurrence of an aberration of the g-line with respect to the F-line, and particularly, an occurrence of the longitudinal chromatic aberration and an occurrence of the chromatic aberration of magnification at the telephoto side.

When a value exceeds a lower limit value of conditional expression (17), the partial dispersion ratio of the third predetermined positive lens element for the C-line and the t-line becomes large. In this case, it is possible to use a low-dispersion glass material (glass material for which Abbe number is large) for the material of the third predetermined positive lens element. Consequently, it is possible to suppress an occurrence of an aberration of the t-line with respect to the C-line, and particularly, an occurrence of the longitudinal chromatic aberration and an occurrence of the of the chromatic aberration of magnification, while suppressing an occurrence of the longitudinal chromatic aberration and an occurrence of the chromatic aberration of magnification at the telephoto side, with respect to the F-line and the C-line.

When the value falls below an upper limit value of conditional expression (17), the partial dispersion ratio of the third predetermined positive lens element for the C-line and the t-line becomes small. Consequently, it is possible to suppress an occurrence of an aberration of the t-line with respect to the C-line, and particularly, an occurrence of the longitudinal chromatic aberration and an occurrence of the chromatic aberration of magnification at the telephoto side.

When a value exceeds a lower limit value of conditional expression (18), the partial dispersion ratio of the third predetermined negative lens element for the g-line and the F-line becomes large. In this case, it is possible to make the refractive index of the third predetermined negative lens element large. As a result, it is possible to correct the spherical aberration at the telephoto side favorably.

When the value falls below an upper limit value of conditional expression (18), the partial dispersion ratio of the third predetermined negative lens element for the g-line and the F-line becomes small. In this case, it is possible to bring the partial dispersion ratio of the third predetermined negative lens element for the g-line and the F-line closer to the partial dispersion ratio of the third predetermined positive lens element for the g-line and the F-line. As a result, it is possible to correct favorably an aberration of the g-line with respect to the F-line, and particularly, the longitudinal chromatic aberration and the chromatic aberration of magnification at the telephoto side.

When a value exceeds a lower limit value of conditional expression (19), the partial dispersion ratio of the third predetermined negative lens element for the C-line and the t-line becomes large. In this case, it is possible to bring the partial dispersion ratio of the third predetermined negative lens element for the C-line and the t-line closer to the partial dispersion ratio of the third predetermined positive lens element for the C-line and the t-line. As a result, it is possible to correct favorably an aberration of the t-line with respect to the C-line, and particularly, the longitudinal chromatic aberration and the chromatic aberration of magnification at the telephoto side.

When the value falls below an upper limit value of conditional expression (19), the partial dispersion ratio of the third predetermined negative lens element for the C-line and the t-line becomes small. In this case, it is possible to make the refractive index of the third predetermined negative lens element large. As a result, it is possible to correct the spherical aberration at the telephoto side favorably.

It is more preferable that the following conditional expression (16') be satisfied instead of conditional expression (16).

$$0.525<(\theta g,F)G3p<0.550 \tag{16'}$$

It is even more preferable that the following conditional expression (16") be satisfied instead of conditional expression (16).

$$0.530<(\theta g,F)G3p<0.540 \tag{16"}$$

It is more preferable that the following conditional expression (17') be satisfied instead of conditional expression (17).

$$0.800<(\theta C,t)G3p<0.880 \tag{17'}$$

It is even more preferable that the following conditional expression (17") be satisfied instead of conditional expression (17).

$$0.820<(\theta C,t)G3p<0.850 \tag{17"}$$

It is more preferable that the following conditional expression (18') be satisfied instead of conditional expression (18).

$$0.530<(\theta g,F)G3n<0.555 \tag{18'}$$

It is even more preferable that the following conditional expression (18") be satisfied instead of conditional expression (18).

$$0.536<(\theta g,F)G3n<0.550 \tag{18"}$$

It is more preferable that the following conditional expression (19') be satisfied instead of conditional expression (19).

$$0.790<(\theta C,t)G3n<0.88 \tag{19'}$$

It is even more preferable that the following conditional expression (19") be satisfied instead of conditional expression (19).

$$0.800<(\theta C,t)G3n<0.87 \tag{19"}$$

In the variable magnification optical system of the present embodiment, it is preferable that a fourth predetermined positive lens element satisfy the following conditional expressions (20) and (21), and a fourth predetermined negative lens element satisfies the following conditional expressions (22) and (23):

$$0.520<(\theta g,F)G4p<0.560 \tag{20},$$

$$0.780<(\theta C,t)G4p<0.900 \tag{21},$$

$$0.520<(\theta g,F)G4n<0.640 \tag{22, and}$$

$$0.640<(\theta C,t)G4n<0.900 \tag{23}$$

where, ($\theta g$, F) G4p denotes a partial dispersion ratio of the fourth predetermined positive lens element, ($\theta C$, t) G4p denotes a partial dispersion ratio of the fourth predetermined positive lens element, ($\theta g$, F) G4n denotes a partial dispersion ratio of the fourth predetermined negative lens element, ($\theta C$, t) G4n denotes a partial dispersion ratio of the fourth predetermined negative lens element, the fourth predetermined positive lens element is all positive lens elements in the fourth lens unit, and the fourth predetermined negative lens element is all negative lens elements in the fourth lens unit.

Conditional expression (20) is a conditional expression of the partial dispersion ratio of the fourth predetermined positive lens element for the g-line and the F-line. Conditional expression (21) is a conditional expression of the partial dispersion ratio of the fourth predetermined positive lens element for the C-line and the t-line. The fourth predetermined positive lens element is all the positive lens elements in the fourth lens unit.

Conditional expression (22) is a conditional expression of the partial dispersion ratio of the fourth predetermined negative lens element for the g-lien and the F-line, and conditional expression (23) is a conditional expression of the partial dispersion ratio of the fourth predetermined negative lens element for the C-line and the t-line. The fourth predetermined negative lens element is all negative lens elements in the fourth lens unit.

When a value exceeds a lower limit value of conditional expression (20), the partial dispersion ratio of the fourth predetermined positive lens element for the g-line and the F-line becomes large. Consequently, it is possible to select a glass material to be used for the fourth predetermined positive lens element in a range of existing glass materials.

When the value falls below an upper limit value of conditional expression (20), the partial dispersion ratio of the fourth predetermined positive lens element for the g-line and the F-line becomes small. In this case, it is possible to suppress an occurrence of an aberration of the g-line with respect to the F-line, and particularly, an occurrence of the longitudinal chromatic aberration and an occurrence of the chromatic aberration of magnification at the telephoto side.

When a value exceeds a lower limit value of conditional expression (21), the partial dispersion ratio of the fourth predetermined positive lens element for the C-line and the t-line becomes large. In this case, it is possible to use a low-dispersion glass material (glass material for which Abbe number is large) for the material of the fourth predetermined positive lens element. Consequently, it is possible to suppress an occurrence of an aberration of the t-line with respect to the C-line, and particularly, an occurrence of the longitudinal chromatic aberration and an occurrence of the of the chromatic aberration of magnification, while suppressing an occurrence of the longitudinal chromatic aberration and an occurrence of the chromatic aberration of magnification at the telephoto side, with respect to the F-line and the C-line.

When the value falls below an upper limit value of conditional expression (21), the partial dispersion ratio of the fourth predetermined positive lens element for the C-line and the t-line becomes small. Consequently, it is possible to suppress an occurrence of an aberration of the t-line with respect to the C-line, and particularly, an occurrence of the longitudinal chromatic aberration and an occurrence of the chromatic aberration of magnification at the telephoto side.

When a value exceeds a lower limit value of conditional expression (22), the partial dispersion ratio of the fourth predetermined negative lens element for the g-line and the F-line becomes large. In this case, it is possible to make the refractive index of the fourth predetermined negative lens element large. As a result, it is possible to correct the spherical aberration at the telephoto side favorably.

When the value falls below an upper limit value of conditional expression (22), the partial dispersion ratio of the fourth predetermined negative lens element for the g-line and the F-line becomes small. In this case, it is possible to bring the partial dispersion ratio of the fourth predetermined negative lens element for the g-line and the F-line closer to the partial dispersion ratio of the fourth predetermined positive lens element for the g-line and the F-line. As a result, it is possible to correct favorably an aberration of the g-line with respect to the F-line, and particularly, the longitudinal chromatic aberration and the chromatic aberration of magnification at the telephoto side.

When a value exceeds a lower limit value of conditional expression (23), the partial dispersion ratio of the fourth predetermined negative lens element for the C-line and the t-line becomes large. In this case, it is possible to bring the partial dispersion ratio of the fourth predetermined negative lens element for the C-line and the t-line closer to the partial dispersion ratio of the fourth predetermined positive lens element for the C-line and the t-line. As a result, it is possible to correct favorably an aberration of the t-line with respect to the C-line, and particularly, the longitudinal chromatic aberration and the chromatic aberration of magnification at the telephoto side.

When the value falls below an upper limit value of conditional expression (23), the partial dispersion ratio of the fourth predetermined negative lens element for the C-line and the t-line becomes small. In this case, it is possible to make the refractive index of the fourth predetermined negative lens element large. As a result, it is possible to correct the spherical aberration at the telephoto side favorably.

It is more preferable that the following conditional expression (20') be satisfied instead of conditional expression (20).

$$0.525<(\theta g,F)G4p<0.550 \tag{20'}$$

It is even more preferable that the following conditional expression (20") be satisfied instead of conditional expression (20).

$$0.530<(\theta g,F)G4p<0.540 \tag{20"}$$

It is more preferable that the following conditional expression (21') be satisfied instead of conditional expression (21).

$$0.800<(\theta C,t)G4p<0.880 \tag{21'}$$

It is even more preferable that the following conditional expression (21") be satisfied instead of conditional expression (21).

$$0.820<(\theta C,t)G4p<0.850 \tag{21"}$$

It is more preferable that the following conditional expression (22') be satisfied instead of conditional expression (22).

$$0.530<(\theta g,F)G4n<0.630 \tag{22'}$$

It is even more preferable that the following conditional expression (22") be satisfied instead of conditional expression (22).

$$0.536<(\theta g,F)G4n<0.620 \tag{22"}$$

It is more preferable that the following conditional expression (23') be satisfied instead of conditional expression (23).

$$0.660<(\theta C,t)G4n<0.860 \tag{23'}$$

It is even more preferable that the following conditional expression (23") be satisfied instead of conditional expression (23).

$$0.670<(\theta C,t)G4n<0.830 \tag{23"}$$

In the variable magnification optical system of the present embodiment, it is preferable that a fifth predetermined positive lens element satisfy the following conditional expressions (24) and (25), and a fifth predetermined negative lens element satisfies the following conditional expressions (26) and (27):

$$0.520<(\theta g,F)G5p<0.560 \tag{24}$$

$$0.780<(\theta C,t)G5p<0.900 \tag{25}$$

$$0.520<(\theta g,F)G5n<0.560 \tag{26}$$

$$0.780<(\theta C,t)G5n<0.900 \tag{27}$$

where, $(\theta g, F) G5p$ denotes a partial dispersion ratio of the fifth predetermined positive lens element, $(\theta C, t) G5p$ denotes a partial dispersion ratio of the fifth predetermined positive lens element, $(\theta g, F) G5n$ denotes a partial dispersion ratio of the fifth predetermined negative lens element, $(\theta C, t) G5n$ denotes a partial dispersion ratio of the fifth predetermined negative lens element, the fifth predetermined positive lens element is all positive lens elements in the fifth lens unit, and the fifth predetermined negative lens element is all negative lens elements in the fifth lens unit.

Conditional expression (24) is a conditional expression of the partial dispersion ratio of the fifth predetermined positive lens element for the g-line and the F-line. Conditional expression (25) is a conditional expression of the partial dispersion ratio of the fifth predetermined positive lens element for the C-line and the t-line. The fifth predetermined positive lens element is all the positive lens elements in the fifth lens unit.

Conditional expression (26) is a conditional expression of the partial dispersion ratio of the fifth predetermined negative lens element for the g-lien and the F-line, and conditional expression (27) is a conditional expression of the partial dispersion ratio of the fifth predetermined negative lens element for the C-line and the t-line. The fifth predetermined negative lens element is all negative lens elements in the fifth lens unit.

When a value exceeds a lower limit value of conditional expression (24), the partial dispersion ratio of the fifth predetermined positive lens element for the g-line and the F-line becomes large. Consequently, it is possible to select a glass material to be used for the fifth predetermined positive lens element in a range of existing glass materials.

When the value falls below an upper limit value of conditional expression (24), the partial dispersion ratio of the fifth predetermined positive lens element for the g-line and the F-line becomes small. In this case, it is possible to suppress an occurrence of an aberration of the g-line with respect to the F-line, and particularly, an occurrence of the longitudinal chromatic aberration and an occurrence of the chromatic aberration of magnification at the telephoto side.

When a value exceeds a lower limit value of conditional expression (25), the partial dispersion ratio of the fifth predetermined positive lens element for the C-line and the t-line becomes large. Consequently, it is possible to suppress an occurrence of an aberration of the t-line with respect to the C-line, and particularly, an occurrence of the longitudinal chromatic aberration and an occurrence of the of the chromatic aberration of magnification, while suppressing an occurrence of the longitudinal chromatic aberration and an occurrence of the chromatic aberration of magnification at the telephoto side, with respect to the F-line and the C-line.

When the value falls below an upper limit value of conditional expression (25), the partial dispersion ratio of the fifth predetermined positive lens element for the g-line and the F-line becomes small. Consequently, it is possible to select a glass material to be used for the fifth predetermined positive lens element in a range of existing glass materials.

When a value exceeds a lower limit value of conditional expression (26), the partial dispersion ratio of the fifth predetermined negative lens element for the g-line and the F-line becomes large. In this case, it is possible to make the refractive index of the fifth predetermined negative lens element large. As a result, it is possible to correct the spherical aberration at the telephoto side favorably.

When the value falls below an upper limit value of conditional expression (26), the partial dispersion ratio of the fifth predetermined negative lens element for the g-line and the F-line becomes small. In this case, it is possible to bring the partial dispersion ratio of the fifth predetermined negative lens element for the g-line and the F-line closer to the partial dispersion ratio of the fifth predetermined positive lens element for the g-line and the F-line. As a result, it is possible to correct favorably an aberration of the g-line with respect to the F-line, and particularly, the longitudinal chromatic aberration and the chromatic aberration of magnification at the telephoto side.

When a value exceeds a lower limit value of conditional expression (27), the partial dispersion ratio of the fifth predetermined negative lens element for the C-line and the t-line becomes large. In this case, it is possible to bring the partial dispersion ratio of the fifth predetermined negative lens element for the C-line and the t-line closer to the partial dispersion ratio of the fifth predetermined positive lens element for the C-line and the t-line. As a result, it is possible to correct favorably an aberration of the t-line with respect to the C-line, and particularly, the longitudinal chromatic aberration and the chromatic aberration of magnification at the telephoto side.

When the value falls below an upper limit value of conditional expression (27), the partial dispersion ratio of the fifth predetermined negative lens element for the C-line and the t-line becomes small. In this case, it is possible to make the refractive index of the fifth predetermined negative lens element large. As a result, it is possible to correct the spherical aberration at the telephoto side favorably.

It is more preferable that the following conditional expression (24') be satisfied instead of conditional expression (24).

$$0.525 < (\theta g, F)G5p < 0.550 \quad (24')$$

It is even more preferable that the following conditional expression (24") be satisfied instead of conditional expression (24).

$$0.530 < (\theta g, F)G5p < 0.540 \quad (24")$$

It is more preferable that the following conditional expression (25') be satisfied instead of conditional expression (25).

$$0.800 < (\theta C, t)G5p < 0.880 \quad (25')$$

It is even more preferable that the following conditional expression (25") be satisfied instead of conditional expression (25).

$$0.820 < (\theta C, t)G5p < 0.850 \quad (25")$$

It is more preferable that the following conditional expression (26') be satisfied instead of conditional expression (26).

$$0.530 < (\theta g, F)G5n < 0.555 \quad (26')$$

It is even more preferable that the following conditional expression (26") be satisfied instead of conditional expression (26).

$$0.536 < (\theta g, F)G5n < 0.550 \quad (26")$$

It is more preferable that the following conditional expression (27') be satisfied instead of conditional expression (27).

$$0.790 < (\theta C, t)G5n < 0.88 \quad (27')$$

It is even more preferable that the following conditional expression (27") be satisfied instead of conditional expression (27).

$$0.800 < (\theta C, t)G5n < 0.87 \quad (27")$$

It is preferable that the variable magnification optical system of the present embodiment include a focusing lens unit on the image side of the third lens unit, and the following conditional expression (28) be satisfied:

$$0.50 < |FSw| < 1.00 \quad (28)$$

where, $$FSw = (1 - \beta fow \times \beta fow) \times \beta imgw \times \beta imgw$$

here,

βfow denotes a lateral magnification of the focusing unit at the wide angle end, and βimgw denotes a lateral magnification of a predetermined optical system at the wide angle end, and the predetermined optical system is an optical system which includes all lens units positioned on the image side of the focusing unit.

Conditional expression (28) is a conditional expression related to a focusing sensitivity at the wide angle end. The focusing sensitivity is an amount of movement of the image plane with respect to an amount of movement of the focusing unit on an optical axis.

When a value exceeds a lower limit value of conditional expression (28), it is possible to suppress an amount of movement of the focusing unit at the time of focusing. As a result, it is possible to suppress a fluctuation in the astigmatism at the time of focusing. Moreover, since it is possible to suppress the amount of movement of the focusing unit, it is possible to lessen a space for the movement of the focusing unit. As a result, it is possible to make the optical system small-sized.

When the value falls below an upper limit value of conditional expression (28), it is possible to suppress the astigmatism that occurs in the focusing unit.

It is more preferable that the following conditional expression (28') be satisfied instead of conditional expression (28).

$$0.60 < |FSw| < 0.95 \quad (28')$$

It is even more preferable that the following conditional expression (28") be satisfied instead of conditional expression (28).

$$0.70 < |FSw| < 0.90 \quad (28")$$

It is preferable that the variable magnification optical system of the present embodiment includes a focusing unit on the image side of the third lens unit, and the following conditional expression (29) be satisfied:

$$0.50 < |FSt| < 1.20 \tag{29}$$

where, $$FSt = (1 - \beta fot \times \beta fot) \times \beta imgt \times \beta imgt$$

here,

βfot denotes a lateral magnification of the focusing unit at the telephoto end, and βimgt denotes a lateral magnification of a predetermined optical system at the telephoto end, and the predetermined optical system is an optical system which includes all lens units positioned on the image side of the focusing unit.

Conditional expression (29) is a conditional expression related to the focusing sensitivity at the telephoto end. Technical significance of conditional expression (29) is same at the technical significance of conditional expression (28).

It is more preferable that the following conditional expression (29') be satisfied instead of conditional expression (29).

$$0.70 < |FSt| < 1.10 \tag{29'}$$

It is even more preferable that the following conditional expression (29") be satisfied instead of conditional expression (29).

$$0.80 < |FSt| < 1.00 \tag{29"}$$

In the variable magnification optical system of the present embodiment, it is preferable that at the time of zooming, the fourth lens unit move, and the fourth lens unit include in order from the object side, a positive lens element, a positive lens element, and a negative lens element.

By moving the fourth lens unit at the time of zooming, it is possible to correct an image-plane fluctuation which occurs at the time of zooming.

Since the fourth lens unit includes two positive lens elements, it is possible make the refractive power of the fourth lens unit large while suppressing a fluctuation in the astigmatism at the time of zooming. Consequently, it is possible to shorten a distance from the fourth lens unit up to the image plane.

By disposing the lens elements in order of the positive lens element, the positive lens element, and the negative lens element from the object side, it is possible to suppress a height of an axial marginal light ray incident on the negative lens element. Consequently, it is possible to suppress the chromatic aberration of magnification that occurs in the fourth lens unit to be small, without letting the spherical aberration to be deteriorated. As a result, it is possible to suppress a fluctuation in the chromatic aberration of magnification at the time of zooming.

In the variable magnification optical system of the present embodiment, it is preferable that at the time of zooming, the fifth lens unit be fixed, and the fifth lens unit include in order from the object side, a first negative lens element, a first positive lens element, a second negative lens element, and a second positive lens element, and the first negative lens element and the first positive lens element be cemented, and the second negative lens element and the second positive lens element be cemented.

By disposing the fifth lens unit nearest to the image plane, it is possible to correct favorably the astigmatism and the chromatic aberration of magnification occurred between the first lens unit and the fourth lens unit without letting the longitudinal chromatic aberration and the spherical aberration to be deteriorated.

By disposing two cemented lenses in the fifth lens unit, it is possible to let the aberration correction be shared by two cemented surfaces. Consequently, it is possible to correct various aberrations more effectively.

In the variable magnification optical system of the present embodiment, it is preferable that the second sub-lens unit includes a first lens element, and the first lens element is the negative lens element in the second sub-lens unit, and the second lens unit includes a second lens element having a positive refractive power, and the second lens element is positioned on the image side of the first lens element, and the following conditional expression (30) be satisfied:

$$0.65 < |fG22n/fG22p| < 1.30 \tag{30}$$

where, fG22n denotes a focal length of the first lens element, and fG22p denotes a focal length of the second lens element.

Conditional expression (30) is a conditional expression in which a ratio of the focal length of the first lens element and the focal length of the second lens element is taken. The first lens element is a negative lens element in the second sub-lens unit. The second lens element has a positive refractive power, and is a lens element positioned on the image side of the first lens element. It is preferable that the second lens element be a lens element positioned nearest to the first lens element.

When a value exceeds a lower limit value of conditional expression (30), it is possible to shorten the focal length of the second lens element, or in other words, to make the refractive power of the second lens element large. Consequently, it is possible to correct favorably the chromatic aberration of magnification occurred in the first lens element at the wide angle end.

When the value falls below an upper limit value of conditional expression (30), it is possible to shorten the focal length of the first lens element, or in other words, to make the refractive power of the first lens element large. As a result, the position of the entrance pupil at the wide angle end is brought further closer to object. Consequently, it is possible to make small the diameter of the first lens unit, and particularly, the diameter of a lens element positioned nearest to object.

It is more preferable that the following conditional expression (30') be satisfied instead of conditional expression (30).

$$0.70 < |fG22n/fG22p| < 1.20 \tag{30'}$$

It is even more preferable that the following conditional expression (30") be satisfied instead of conditional expression (30).

$$0.75 < |fG22n/fG22p| < 1.10 \tag{30"}$$

In the variable magnification optical system of the present embodiment, it is preferable that the third lens unit be fixed at the time of zooming.

By letting the third lens unit to be fixed all the time with respect to the image plane, at the time of zooming, it is possible to reduce a manufacturing error and to simplify a zoom mechanism.

An image pickup apparatus of the present embodiment includes an optical system, and an image pickup element which has an image pickup surface, and which converts an image formed on the image pickup surface by the optical system to an electric signal, and the optical system is the variable magnification optical system of the present embodiment.

It is possible to provide an image pickup apparatus which is small-sized, and which can achieve an image of a high image quality.

Examples of variable magnification optical systems will be described below in detail by referring to the accompanying diagrams. However, the present invention is not restricted to the examples described below.

Lens cross-sectional views of each example will be described below.

FIG. 1A, FIG. 2A, FIG. 3A, FIG. 4A, FIG. 5A, and FIG. 6A show lens cross-sectional views at the wide angle end.

FIG. 1B, FIG. 2B, FIG. 3B, FIG. 4B, FIG. 5B, and FIG. 6B show lens cross-sectional views in an intermediate focal length state.

FIG. 1C, FIG. 2C, FIG. 3C, FIG. 4C, FIG. 5C, and FIG. 6C show lens cross-sectional views at the telephoto end.

Aberration diagrams of each example will be described below.

FIG. 7A, FIG. 8A, FIG. 9A, FIG. 10A, FIG. 11A, and FIG. 12A show a spherical aberration (SA) at the wide angle end.

FIG. 7B, FIG. 8B, FIG. 9B, FIG. 10B, FIG. 11B, and FIG. 12B show an astigmatism at the wide angle end.

FIG. 7C, FIG. 8C, FIG. 9C, FIG. 10C, FIG. 11C, and FIG. 12C show a distortion at the wide angle end.

FIG. 7D, FIG. 8D, FIG. 9D, FIG. 10D, FIG. 11D, and FIG. 12D show a chromatic aberration of magnification (CC) at the wide angle end.

FIG. 7E, FIG. 8E, FIG. 9E, FIG. 10E, FIG. 11E, and FIG. 12E show a spherical aberration (SA) in the intermediate focal length state.

FIG. 7F, FIG. 8F, FIG. 9F, FIG. 10F, FIG. 11F, and FIG. 12F show an astigmatism (AS) in the intermediate focal length state.

FIG. 7G, FIG. 8G, FIG. 9G, FIG. 10G, FIG. 11G, and FIG. 12G show a distortion (DT) in the intermediate focal length state.

FIG. 7H, FIG. 8H, FIG. 9H, FIG. 10H, FIG. 11H, and FIG. 12H show a chromatic aberration of magnification (CC) in the intermediate focal length state.

FIG. 7I, FIG. 8I, FIG. 9I, FIG. 10I, FIG. 11I, and FIG. 12I show a spherical aberration (SA) at the telephoto end.

FIG. 7J, FIG. 8J, FIG. 9J, FIG. 10J, FIG. 11J, and FIG. 12J show an astigmatism (AS) at the telephoto end.

FIG. 7K, FIG. 8K, FIG. 9K, FIG. 10K, FIG. 11K, and FIG. 12K show a distortion (DT) at the telephoto end.

FIG. 7L, FIG. 8L, FIG. 9L, FIG. 10L, FIG. 11L, and FIG. 12L show a chromatic aberration of magnification (CC) at the telephoto end.

The lens cross-sectional views are lens cross-sectional views at the time of focusing to an object at infinity (at the time of focusing to an infinite object point). The aberration diagrams are aberration diagrams at the time of focusing to an object at infinity (at the time of focusing to an infinite object point).

A first lens unit is denoted by G1, a second lens unit is denoted by G2, a third lens unit is denoted by G3, a fourth lens unit is denoted by G4, a fifth lens unit is denoted by G5, an aperture stop is denoted by S, and an image plane (image pickup surface) is denoted by I. Moreover, a cover glass C of an image pickup element is disposed between the fifth lens unit G5 and the image plane I.

A variable magnification optical system of an example 1 includes in order from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a positive refractive power. An aperture stop (A stop) S is disposed between the second lens unit G2 and the third lens unit G3.

The first lens unit G1 includes a negative meniscus lens L1 having a convex surface directed toward the object side, a biconvex positive lens L2, a negative meniscus lens L3 having a convex surface directed toward the object side, a biconvex positive lens L4, a biconvex positive lens L5, and a positive meniscus lens L6 having a convex surface directed toward the object side. Here, the negative meniscus lens L1 and the biconvex positive lens L2 are cemented. The negative meniscus lens L3 and the biconvex positive lens L4 are cemented.

The second lens unit G2 includes a negative meniscus lens L7 having a convex surface directed toward the object side, a biconcave negative lens L8, a biconvex positive lens L9, a biconcave negative lens L10, and a biconvex positive lens L11. Here, the biconcave negative lens L8 and the biconvex positive lens L9 are cemented. The biconcave negative lens L10 and the biconvex positive lens L11 are cemented.

A first sub-lens unit includes the negative meniscus lens L7. A second sub-lens unit includes the biconcave negative lens L8 and the biconvex positive lens L9. A third sub-lens unit includes the biconcave negative lens L10 and the biconvex positive lens L11.

The third lens unit G3 includes a biconvex positive lens L12, a negative meniscus lens L13 having a convex surface directed toward the object side, a biconvex positive lens L14, and a negative meniscus lens L15 having a convex surface directed toward the object side. Here, the negative meniscus lens L13 and the biconvex positive lens L14 are cemented.

The fourth lens unit G4 includes a biconvex positive lens L16, a biconvex positive lens L17, and a biconcave negative lens L18. Here, the biconvex positive lens L17 and the biconcave negative lens L18 are cemented.

The fifth lens unit G5 includes a negative meniscus lens L19 having a convex surface directed toward the object side, a biconvex positive lens L20, a negative meniscus lens L21 having a convex surface directed toward the object side, and a biconvex positive lens L22. Here, the negative meniscus lens L19 and the biconvex positive lens L20 are cemented. The negative meniscus lens L21 and the biconvex positive lens L22 are cemented.

At the time of zooming from a wide angle end to a telephoto end, the first lens unit G1 is fixed, the second lens unit G2 moves toward an image side, the third lens unit G3 is fixed, the fourth lens unit G4, after moving toward the object side, moves toward the image side, and the fifth lens unit G5 is fixed.

An aspheric surface is provided to a total of three surfaces which are an object-side surface of the negative meniscus lens L7, and both surfaces of the biconvex positive lens L12.

A variable magnification optical system of an example 2 includes in order from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a positive refractive power. An aperture stop (A stop) S is disposed between the second lens unit G2 and the third lens unit G3.

The first lens unit G1 includes a negative meniscus lens L1 having a convex surface directed toward the object side, a biconvex positive lens L2, a negative meniscus lens L3 having a convex surface directed toward the object side, a positive meniscus lens L4 having a convex surface directed toward the object side, and a positive meniscus lens L5 having a convex surface directed toward the object side. Here, the negative meniscus lens L1 and the biconvex positive lens L2 are cemented. The negative meniscus lens L3 and the positive meniscus lens L4 are cemented.

The second lens unit G2 includes a biconcave negative lens L6, a biconcave negative lens L7, a biconvex positive lens L8, a biconcave negative lens L9, and a positive meniscus lens L10 having a convex surface directed toward the object side. Here, the biconcave negative lens L7 and the biconvex positive lens L8 are cemented. The biconcave negative lens L9 and the positive meniscus lens L10 are cemented.

A first sub-lens unit includes the biconcave negative lens L6. A second sub-lens unit includes the biconcave negative lens L7 and the biconvex positive lens L8. A third sub-lens unit includes the biconcave negative lens L9 and the positive meniscus lens L10.

The third lens unit G3 includes a biconvex positive lens L11, a biconcave negative lens L12, a biconvex positive lens L13, and a negative meniscus lens L14 having a convex surface directed toward the object side. Here, the biconcave negative lens L12 and the biconvex positive lens L13 are cemented.

The fourth lens unit G4 includes a biconvex positive lens L15, a biconvex positive lens L16, and a biconcave negative lens L17. Here, the biconvex positive lens L16 and the biconcave negative lens L17 are cemented.

The fifth lens unit G5 includes a positive meniscus lens L18 having a convex surface directed toward an image side, a negative meniscus lens L19 having a convex surface directed toward the image side, a negative meniscus lens L20 having a convex surface directed toward the object side, and a positive meniscus lens L21 having a convex surface directed toward the object side. Here, the positive meniscus lens L18 and the negative meniscus lens L19 are cemented. The negative meniscus lens L20 and the positive meniscus lens L21 are cemented.

At the time of zooming from a wide angle end to a telephoto end, the first lens unit G1 is fixed, the second lens unit G2 moves toward the image side, the third lens unit G3 is fixed, the fourth lens unit G4, after moving toward the object side, moves toward the image side, and the fifth lens unit G5 is fixed.

An aspheric surface is provided to a total of four surfaces which are both surfaces of the biconcave negative lens L6 and both surfaces of the biconvex positive lens L11.

A variable magnification optical system of an example 3 includes in order from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a positive refractive power. An aperture stop (A stop) S is disposed between the second lens unit G2 and the third lens unit G3.

The first lens unit G1 includes a biconcave negative lens L1, a biconvex positive lens L2, a negative meniscus lens L3 having a convex surface directed toward the object side, a biconvex positive lens L4, a biconvex positive lens L5, and a positive meniscus lens L6 having a convex surface directed toward the object side. Here, the biconcave negative lens L1 and the biconvex positive lens L2 are cemented. The negative meniscus lens L3 and the biconvex positive lens L4 are cemented.

The second lens unit G2 includes a negative meniscus lens L7 having a convex surface directed toward the object side, a biconcave negative lens L8, a biconvex positive lens L9, and a negative meniscus lens L10 having a convex surface directed toward an image side. Here, the biconcave negative lens L8 and the biconvex positive lens L9 are cemented.

A first sub-lens unit includes the negative meniscus lens L7. A second sub-lens unit includes the biconcave negative lens L8 and the biconvex positive lens L9. A third sub-lens unit includes the negative meniscus lens L10.

The third lens unit G3 includes a biconvex positive lens L11, a negative meniscus lens L12 having a convex surface directed toward the object side, a biconvex positive lens L13, and a biconcave negative lens L14. Here, the negative meniscus lens L12 and the biconvex positive lens L13 are cemented.

The fourth lens unit G4 includes a biconvex positive lens L15, a biconvex positive lens L16, and a biconcave negative lens L17. Here, the biconvex positive lens L16 and the biconcave negative lens L17 are cemented.

The fifth lens unit G5 includes a negative meniscus lens L18 having a convex surface directed toward the object side, a positive meniscus lens L19 having a convex surface directed toward the object side, a negative meniscus lens L20 having a convex surface directed toward the object side, and a biconvex positive lens L21. Here, the negative meniscus lens L18 and the positive meniscus lens L19 are cemented. The negative meniscus lens L20 and the biconvex positive lens L21 are cemented.

At the time of zooming from a wide angle end to a telephoto end, the first lens unit G1 is fixed, the second lens unit G2 moves toward the image side, the third lens unit G3 is fixed, the fourth lens unit G4, after moving toward the object side, moves toward the image side, and the fifth lens unit G5 is fixed.

An aspheric surface is provided to a total of three surfaces which are an object-side surface of the negative meniscus lens L7, and both surfaces of the biconvex positive lens L11.

A variable magnification optical system of an example 4 includes in order from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a positive refractive power. An aperture stop (A stop) S is disposed between the second lens unit G2 and the third lens unit G3.

The first lens unit G1 includes a biconcave negative lens L1, a biconvex positive lens L2, a negative meniscus lens L3 having a convex surface directed toward the object side, a biconvex positive lens L4, a biconvex positive lens L5, and a positive meniscus lens L6 having a convex surface directed toward the object side. Here, the biconcave negative lens L1 and the biconvex positive lens L2 are cemented. The negative meniscus lens L3 and the biconvex positive lens L4 are cemented.

The second lens unit G2 includes a negative meniscus lens L7 having a convex surface directed toward the object side, a biconcave negative lens L8, a biconvex positive lens L9, and a biconcave negative lens L10. Here, the biconvex positive lens L9 and the biconcave negative lens L10 are cemented.

A first sub-lens unit includes the negative meniscus lens L7. A second sub-lens unit includes the biconcave negative lens L8. A third sub-lens unit includes the biconvex positive lens L9 and the biconcave negative lens L10.

The third lens unit G3 includes a biconvex positive lens L11, a negative meniscus lens L12 having a convex surface directed toward the object side, a biconvex positive lens L13, and a biconcave negative lens L14. Here, the negative meniscus lens L12 and the biconvex positive lens L13 are cemented.

The fourth lens unit G4 includes a biconvex positive lens L15, a biconvex positive lens L16, and a negative meniscus lens L17 having a convex surface directed toward an image side. Here, the biconvex positive lens L16 and the negative meniscus lens L17 are cemented.

The fifth lens unit G5 includes a negative meniscus lens L18 having a convex surface directed toward the object side, a positive meniscus lens L19 having a convex surface directed toward the object side, a negative meniscus lens L20 having a convex surface directed toward the object side, and a biconvex positive lens L21. Here, the negative meniscus lens L18 and the positive meniscus lens L19 are cemented. The negative meniscus lens L20 and the biconvex positive lens L21 are cemented.

At the time of zooming from a wide angle end to a telephoto end, the first lens unit G1 is fixed, the second lens unit G2 moves toward the image side, the third lens unit G3 is fixed, the fourth lens unit G4, after moving toward the object side, moves toward the image side. The fifth lens unit G5 is fixed.

An aspheric surface is provided to a total of three surfaces which are an object-side surface of the negative meniscus lens L7, and both surfaces of the biconvex positive lens L11.

A variable magnification optical system of an example 5 includes in order from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a positive refractive power. An aperture stop (A stop) S is disposed in the third lens unit G3.

The first lens unit G1 includes a negative meniscus lens L1 having a convex surface directed toward the object side, a biconvex positive lens L2, a negative meniscus lens L3 having a convex surface directed toward the object side, a biconvex positive lens L4, a biconvex positive lens L5, and a positive meniscus lens L6 having a convex surface directed toward the object side. Here, the negative meniscus lens L1 and the biconvex positive lens L2 are cemented. The negative meniscus lens L3 and the biconvex positive lens L4 are cemented.

The second lens unit G2 includes a negative meniscus lens L7 having a convex surface directed toward the object side, a biconcave negative lens L8, a biconvex positive lens L9, a biconcave negative lens L10, and a biconvex positive lens L11. Here, the biconcave negative lens L8 and the biconvex positive lens L9 are cemented. The biconcave negative lens L10 and the biconvex positive lens L11 are cemented.

A first sub-lens unit includes the negative meniscus lens L7. A second sub-lens unit includes the biconcave negative lens L8 and the biconvex positive lens L9. A third sub-lens unit includes the biconcave negative lens L10 and the biconvex positive lens L11.

The third lens unit G3 includes a biconvex positive lens L12, a negative meniscus lens L13 having a convex surface directed toward the object side, a biconvex positive lens L14, and a biconcave negative lens L15. Here, the negative meniscus lens L13 and the biconvex positive lens L14 are cemented.

The fourth lens unit G4 includes a biconvex positive lens L16, a biconvex positive lens L17, and a biconcave negative lens L18. Here, the biconvex positive lens L17 and the biconcave negative lens L18 are cemented.

The fifth lens unit G5 includes a negative meniscus lens L19 having a convex surface directed toward the object side, a biconvex positive lens L20, a negative meniscus lens L21 having a convex surface directed toward the object side, and the biconvex positive lens L22. Here, the negative meniscus lens L19 and the biconvex positive lens L20 are cemented. The negative meniscus lens L21 and the biconvex positive lens L22 are cemented.

At the time of zooming from a wide angle end to a telephoto end, the first lens unit G1 is fixed, the second lens unit G2 moves toward an image side, the third lens unit G3 is fixed, the fourth lens unit G4, after moving toward the object side, moves toward the image side, and the fifth lens unit G5 is fixed.

An aspheric surface is provided to a total of three surfaces which are an object-side surface of the negative meniscus lens L7, and both surfaces of the biconvex positive lens L12.

A variable magnification optical system of an example 6 includes in order from an object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a positive refractive power. An aperture stop (A stop) S is disposed between the second lens unit G2 and the third lens unit G3.

The first lens unit G1 includes a negative meniscus lens L1 having a convex surface directed toward the object side, a biconvex positive lens L2, a negative meniscus lens L3 having a convex surface directed toward the object side, a positive meniscus lens L4 having a convex surface directed toward the object side, a biconvex positive lens L5, and a positive meniscus lens L6 having a convex surface directed toward the object side. Here, the negative meniscus lens L1 and the biconvex positive lens L2 are cemented. The negative meniscus lens L3 and the positive meniscus lens L4 are cemented.

The second lens unit G2 includes a negative meniscus lens L7 having a convex surface directed toward the object side, a biconcave negative lens L8, a biconvex positive lens L9, a negative meniscus lens L10 having a convex surface directed toward an image side, and a positive meniscus lens L11 having a convex surface directed toward the image side. Here, the biconcave negative lens L8 and the biconvex positive lens L9 are cemented. The negative meniscus lens L10 and the positive meniscus lens L11 are cemented.

A first sub-lens unit includes the negative meniscus lens L7. A second sub-lens unit includes the biconcave negative lens L8 and the biconvex positive lens L9. A third sub-lens unit includes the negative meniscus lens L10 and the positive meniscus lens L11.

The third lens unit G3 includes a biconvex positive lens L12, a negative meniscus lens L13 having a convex surface directed toward the object side, a biconvex positive lens L14, and a biconcave negative lens L15. Here, the negative meniscus lens L13 and the biconvex positive lens L14 are cemented.

The fourth lens unit G4 includes a biconvex positive lens L16, a biconvex positive lens L17, and a biconcave negative lens L18. Here, the biconvex positive lens L17 and the biconcave negative lens L18 are cemented.

The fifth lens unit G5 includes a negative meniscus lens L19 having a convex surface directed toward the object side, a biconvex positive lens L20, a negative meniscus lens L21 having a convex surface directed toward the object side, and a biconvex positive lens L22. Here, the negative meniscus lens L19 and the biconvex positive lens L20 are cemented. The negative meniscus lens L21 and the biconvex positive lens L22 are cemented.

At the time of zooming from a wide angle end to a telephoto end, the first lens unit G1 is fixed, the second lens unit G2 moves toward the image side, the third lens unit G3 is fixed, the fourth lens unit G4, after moving toward the object side, moves toward the image side, and the fifth lens unit G5 is fixed.

An aspheric surface is provided to a total of three surfaces which are an object-side surface of the negative meniscus lens L7, and both surfaces of the biconvex positive lens L12.

Numerical data of each example described above is shown below. In Surface data, r denotes radius of curvature of each lens surface, d denotes a distance between respective lens surfaces, nd denotes a refractive index of each lens for a d-line, vd denotes an Abbe number for each lens and denotes an aspherical surface.

Moreover, in Zoom data, f denotes a focal length of the entire system, FNO. denotes an F number, ω denotes a half angle of view, IH denotes an image height, BF denotes a back focus, LTL denotes a lens total length of the optical system. Further, back focus is a unit which is expressed upon air conversion of a distance from a rearmost lens surface to a paraxial image surface. The lens total length is a distance from a frontmost lens surface to the rearmost lens surface plus back focus.

Further, in Unit focal length, each of f1, f2 . . . is a focal length of each lens unit.

A shape of an aspherical surface is defined by the following expression where the direction of the optical axis is represented by z, the direction orthogonal to the optical axis is represented by y, a conical coefficient is represented by K, aspherical surface coefficients are represented by A4, A6, A8, A10, A12 . . .

$$Z=(y^2/r)/[1+\{1-(1+k)(y/r)^2\}^{1/2}]+A4y^4+A6y^6+A8y^8+A10y^{10}+A12y^{12}+\ldots$$

Further, in the aspherical surface coefficients, 'E-n' (where, n is an integral number) indicates '$10^{-n}$'. Moreover, these symbols are commonly used in the following numerical data for each example.

EXAMPLE 1

Unit mm

Surface data

| Surface no. | r | d | nd | vd |
|---|---|---|---|---|
| Object plane | ∞ | ∞ | | |
| 1 | 431.364 | 1.46 | 1.75500 | 52.32 |
| 2 | 68.349 | 11.19 | 1.43875 | 94.93 |
| 3 | −235.369 | 0.10 | | |
| 4 | 208.117 | 1.00 | 1.64000 | 60.08 |
| 5 | 60.516 | 9.90 | 1.43875 | 94.93 |
| 6 | −1774.661 | 1.74 | | |
| 7 | 61.514 | 7.32 | 1.43875 | 94.93 |
| 8 | −415.961 | 0.10 | | |
| 9 | 48.375 | 5.46 | 1.43875 | 94.93 |
| 10 | 156.024 | Variable | | |
| 11* | 69.391 | 1.00 | 1.76802 | 49.24 |
| 12 | 7.765 | 5.32 | | |
| 13 | −11.800 | 0.52 | 1.49700 | 81.54 |
| 14 | 14.208 | 3.00 | 1.80100 | 34.97 |
| 15 | −122.650 | 1.44 | | |
| 16 | −15.435 | 0.50 | 1.43875 | 94.93 |
| 17 | 2706.128 | 2.22 | 1.64000 | 60.08 |
| 18 | −25.283 | Variable | | |
| 19(Stop) | ∞ | 1.20 | | |
| 20* | 20.312 | 5.00 | 1.49700 | 81.54 |
| 21* | −46.806 | 0.20 | | |
| 22 | 681.141 | 0.70 | 1.65160 | 58.55 |
| 23 | 23.127 | 5.30 | 1.43875 | 94.93 |
| 24 | −23.107 | 0.76 | | |
| 25 | 449.302 | 0.60 | 1.64000 | 60.08 |
| 26 | 23.277 | Variable | | |
| 27 | 20.251 | 3.20 | 1.43875 | 94.93 |
| 28 | −28.599 | 0.50 | | |
| 29 | 27.386 | 3.20 | 1.43875 | 94.93 |
| 30 | −21.700 | 0.60 | 1.72916 | 54.68 |
| 31 | 55.000 | Variable | | |
| 32 | 48.300 | 0.60 | 1.72916 | 54.68 |
| 33 | 7.536 | 3.00 | 1.51633 | 64.14 |
| 34 | −53.038 | 0.68 | | |
| 35 | 17.032 | 0.80 | 1.67790 | 55.34 |
| 36 | 7.500 | 2.50 | 1.43875 | 94.93 |
| 37 | −103.416 | 3.91 | | |
| 38 | ∞ | 2.12 | 1.51633 | 64.14 |
| 39 | ∞ | 0.40 | | |
| Image plane | ∞ | | | |

Aspheric surface data

11th surface k = 0.000
A4 = 5.08948e−05, A6 = −2.94765e−07, A8 = 2.36268e−10

20th surface k = 0.000
A4 = −1.81866e−05, A6 = 6.29863e−08

21th surface k = 0.000
A4 = 3.83811e−05, A6 = 7.18566e−08

Zoom data
Zoom ratio 36.00

| | WE | ST | TE |
|---|---|---|---|
| f | 4.85 | 28.43 | 174.57 |
| FNO. | 1.69 | 3.06 | 3.96 |
| 2ω | 66.48 | 12.31 | 2.04 |
| IH | 3.20 | 3.20 | 3.20 |
| BF (in air) | 5.71 | 5.71 | 5.71 |
| LTL (in air) | 169.25 | 169.25 | 169.25 |
| d10 | 0.60 | 38.33 | 55.57 |
| d18 | 56.92 | 19.20 | 1.95 |
| d26 | 19.19 | 7.58 | 20.60 |
| d31 | 5.71 | 17.33 | 4.30 |

Unit focal length f1 = 72.24   f2 = −9.61   f3 = 44.53   f4 = 33.81   f5 = 101.78

EXAMPLE 2

Unit mm

Surface data

| Surface no. | r | d | nd | νd |
|---|---|---|---|---|
| Object plane | ∞ | ∞ | | |
| 1 | 317.592 | 1.46 | 1.75500 | 52.32 |
| 2 | 69.935 | 12.23 | 1.43875 | 94.93 |
| 3 | −219.017 | 0.10 | | |
| 4 | 81.779 | 1.00 | 1.64000 | 60.08 |
| 5 | 50.144 | 8.22 | 1.43875 | 94.93 |
| 6 | 682.576 | 0.10 | | |
| 7 | 48.467 | 7.26 | 1.43875 | 94.93 |
| 8 | 569.238 | Variable | | |
| 9* | −79.376 | 1.00 | 1.76802 | 49.24 |
| 10* | 10.133 | 6.40 | | |
| 11 | −12.465 | 0.50 | 1.49700 | 81.54 |
| 12 | 45.631 | 2.85 | 1.80100 | 34.97 |
| 13 | −27.254 | 0.10 | | |
| 14 | −29156753.884 | 0.50 | 1.43875 | 94.93 |
| 15 | 15.530 | 2.38 | 1.64000 | 60.08 |
| 16 | 46.240 | Variable | | |
| 17(Stop) | ∞ | 1.20 | | |
| 18* | 17.709 | 4.36 | 1.49700 | 81.54 |
| 19* | −154.026 | 0.70 | | |
| 20 | −93.211 | 0.70 | 1.65160 | 58.55 |
| 21 | 28.527 | 5.30 | 1.43875 | 94.93 |
| 22 | −20.759 | 0.76 | | |
| 23 | 56.517 | 0.60 | 1.64000 | 60.08 |
| 24 | 20.574 | Variable | | |
| 25 | 16.178 | 4.21 | 1.43875 | 94.93 |
| 26 | −30.092 | 0.10 | | |
| 27 | 18.854 | 4.74 | 1.43875 | 94.93 |
| 28 | −16.261 | 0.50 | 1.72916 | 54.68 |
| 29 | 25.350 | Variable | | |
| 30 | −34.158 | 3.00 | 1.72916 | 54.68 |
| 31 | −15.236 | 3.00 | 1.51633 | 64.14 |
| 32 | −62.457 | 0.20 | | |
| 33 | 12.845 | 0.80 | 1.67790 | 55.34 |
| 34 | 5.297 | 5.18 | 1.43875 | 94.93 |
| 35 | 273.688 | 1.70 | | |
| 36 | ∞ | 2.12 | 1.51633 | 64.14 |
| 37 | ∞ | 0.40 | | |
| Image plane | ∞ | | | |

Aspheric surface data ninth surface k = 0.000
A4 = 6.42244e−05, A6 = −2.72946e−07, A8 = 5.77050e−10 tenth surface k = 0.000
A4 = 3.80243e−06

18th surface k = 0.000
A4 = −7.57698e−06, A6 = −2.29413e−08, A8 = 3.73082e−10,
A10 = −1.55550e−12

19th surface k = 0.000
A4 = 4.70246e−05, A6 = 2.21108e−08, A8 = 4.01297e−10,
A10 = −1.01030e−12

Zoom data
Zoom ratio 29.97

| | WE | ST | TE |
|---|---|---|---|
| f | 4.82 | 26.36 | 144.54 |
| FNO. | 1.60 | 2.99 | 3.30 |
| 2ω | 69.71 | 13.44 | 2.48 |
| IH | 3.20 | 3.20 | 3.20 |
| BF (in air) | 3.50 | 3.50 | 3.50 |

-continued

Unit mm

| | | | |
|---|---|---|---|
| LTL (in air) | 169.28 | 169.28 | 169.28 |
| d8 | 0.60 | 43.96 | 65.81 |
| d16 | 66.37 | 23.02 | 1.16 |
| d24 | 16.39 | 6.68 | 9.87 |
| d29 | 2.99 | 12.69 | 9.51 |

Unit focal length f1 = 87.73   f2 = −11.56   f3 = 49.26   f4 = 34.43   f5 = 105.34

EXAMPLE 3

Unit mm

Surface data

| Surface no. | r | d | nd | νd |
|---|---|---|---|---|
| Object plane | ∞ | ∞ | | |
| 1 | −409.623 | 1.46 | 1.69680 | 55.53 |
| 2 | 94.731 | 11.53 | 1.43875 | 94.93 |
| 3 | −118.168 | 0.10 | | |
| 4 | 231.902 | 1.00 | 1.72916 | 54.68 |
| 5 | 67.028 | 10.00 | 1.43875 | 94.93 |
| 6 | −258.268 | 1.95 | | |
| 7 | 59.126 | 6.91 | 1.43875 | 94.93 |
| 8 | −2459.069 | 0.10 | | |
| 9 | 46.889 | 5.24 | 1.43875 | 94.93 |
| 10 | 106.984 | Variable | | |
| 11* | 241.092 | 1.00 | 1.72903 | 54.04 |
| 12 | 8.321 | 5.25 | | |
| 13 | −12.183 | 0.52 | 1.43875 | 94.93 |
| 14 | 15.095 | 3.00 | 1.80100 | 34.97 |
| 15 | −68.951 | 0.58 | | |
| 16 | −28.253 | 0.50 | 1.43875 | 94.93 |
| 17 | −442.190 | Variable | | |
| 18(Stop) | ∞ | 1.20 | | |
| 19* | 18.785 | 5.00 | 1.49700 | 81.54 |
| 20* | −51.419 | 0.20 | | |
| 21 | 225.849 | 0.70 | 1.64000 | 60.08 |
| 22 | 19.679 | 5.30 | 1.43875 | 94.93 |
| 23 | −22.623 | 0.20 | | |
| 24 | −503.333 | 0.60 | 1.64000 | 60.08 |
| 25 | 25.661 | Variable | | |
| 26 | 31.363 | 2.80 | 1.43875 | 94.93 |
| 27 | −56.351 | 0.53 | | |
| 28 | 27.965 | 4.20 | 1.43875 | 94.93 |
| 29 | −95.094 | 0.60 | 1.85478 | 24.80 |
| 30 | 560.167 | Variable | | |
| 31 | 38.513 | 0.70 | 1.64000 | 60.08 |
| 32 | 6.312 | 2.80 | 1.49700 | 81.54 |
| 33 | 66.295 | 0.20 | | |
| 34 | 16.138 | 1.81 | 1.64000 | 60.08 |
| 35 | 5.700 | 3.50 | 1.43875 | 94.93 |
| 36 | −27.696 | 1.88 | | |
| 37 | ∞ | 2.12 | 1.51633 | 64.14 |
| 38 | ∞ | 0.40 | | |
| Image plane | ∞ | | | |

Aspheric surface data

11th surface k = 0.000
A4 = 4.62498e−05, A6 = −2.53865e−07, A8 = 2.41119e−10

19th surface k = 0.000
A4 = −1.53343e−05, A6 = 8.35335e−08

-continued

Unit mm

20th surface k = 0.000
A4 = 4.45034e−05, A6 = 9.69499e−08

Zoom data
Zoom ratio 30.34

|   | WE | ST | TE |
|---|---|---|---|
| f | 4.85 | 28.43 | 147.13 |
| FNO. | 1.78 | 3.01 | 4.09 |
| 2ω | 67.02 | 12.31 | 2.41 |
| IH | 3.20 | 3.20 | 3.20 |
| BF (in air) | 3.68 | 3.68 | 3.68 |
| LTL (in air) | 169.25 | 169.25 | 169.25 |
| d10 | 0.60 | 39.69 | 56.35 |
| d17 | 58.57 | 19.48 | 2.82 |
| d25 | 20.91 | 8.59 | 13.19 |
| d30 | 6.02 | 18.34 | 13.74 |

Unit focal length f1 = 74.06   f2 = −9.43   f3 = 41.61   f4 = 31.63   f5 = 128.20

EXAMPLE 4

Unit mm

Surface data

| Surface no. | r | d | nd | vd |
|---|---|---|---|---|
| Object plane | ∞ | ∞ | | |
| 1 | −412.287 | 1.46 | 1.69680 | 55.53 |
| 2 | 96.578 | 11.13 | 1.43875 | 94.93 |
| 3 | −118.104 | 0.10 | | |
| 4 | 216.765 | 1.00 | 1.72916 | 54.68 |
| 5 | 66.024 | 10.00 | 1.43875 | 94.93 |
| 6 | −279.727 | 2.24 | | |
| 7 | 59.267 | 6.81 | 1.43875 | 94.93 |
| 8 | −79322.928 | 0.10 | | |
| 9 | 46.636 | 5.24 | 1.43875 | 94.93 |
| 10 | 111.302 | Variable | | |
| 11* | 178.922 | 1.00 | 1.72903 | 54.04 |
| 12 | 7.911 | 5.25 | | |
| 13 | −11.247 | 0.52 | 1.43875 | 94.93 |
| 14 | 22.453 | 0.20 | | |
| 15 | 18.603 | 3.00 | 1.80100 | 34.97 |
| 16 | −47.413 | 0.50 | 1.43875 | 94.93 |
| 17 | 69.982 | Variable | | |
| 18(Stop) | ∞ | 1.20 | | |
| 19* | 19.166 | 5.00 | 1.49700 | 81.54 |
| 20* | −49.492 | 0.20 | | |
| 21 | 166.418 | 0.70 | 1.64000 | 60.08 |
| 22 | 19.364 | 5.30 | 1.43875 | 94.93 |
| 23 | −22.700 | 0.20 | | |
| 24 | −239.609 | 0.60 | 1.64000 | 60.08 |
| 25 | 26.204 | Variable | | |
| 26 | 30.806 | 2.80 | 1.43875 | 94.93 |
| 27 | −60.030 | 0.93 | | |
| 28 | 34.012 | 4.20 | 1.43875 | 94.93 |
| 29 | −56.931 | 0.60 | 1.85478 | 24.80 |
| 30 | −190.812 | Variable | | |
| 31 | 26.599 | 0.70 | 1.64000 | 60.08 |
| 32 | 6.124 | 2.80 | 1.49700 | 81.54 |
| 33 | 38.579 | 0.20 | | |
| 34 | 16.596 | 1.81 | 1.64000 | 60.08 |

-continued

Unit mm

| 35 | 5.700 | 3.50 | 1.43875 | 94.93 |
|---|---|---|---|---|
| 36 | −28.707 | 1.65 | | |
| 37 | ∞ | 2.12 | 1.51633 | 64.14 |
| 38 | ∞ | 0.40 | | |
| Image plane | ∞ | | | |

Aspheric surface data

11th surface k = 0.000
A4 = 5.50266e−05, A6 = −3.22177e−07, A8 = 1.92464e−10

19th surface k = 0.000
A4 = −1.35679e−05, A6 = 8.98349e−08

20th surface k = 0.000
A4 = 4.54909e−05, A6 = 9.90974e−08

Zoom data
Zoom ratio 33.73

|   | WE | ST | TE |
|---|---|---|---|
| f | 4.85 | 28.42 | 163.61 |
| FNO. | 1.80 | 3.02 | 4.06 |
| 2ω | 66.82 | 12.31 | 2.17 |
| IH | 3.20 | 3.20 | 3.20 |
| BF (in air) | 3.44 | 3.44 | 3.44 |
| LTL (in air) | 169.25 | 169.25 | 169.25 |
| d10 | 0.60 | 39.71 | 56.99 |
| d17 | 58.83 | 19.72 | 2.45 |
| d25 | 20.90 | 8.43 | 16.99 |
| d30 | 6.16 | 18.64 | 10.07 |

Unit focal length f1 = 73.84   f2 = −9.47   f3 = 41.86   f4 = 32.07   f5 = 134.28

EXAMPLE 5

Unit mm

Surface data

| Surface no. | r | d | nd | vd |
|---|---|---|---|---|
| Object plane | ∞ | ∞ | | |
| 1 | 799.087 | 1.46 | 1.75500 | 52.32 |
| 2 | 73.082 | 11.03 | 1.43875 | 94.93 |
| 3 | −196.994 | 0.10 | | |
| 4 | 190.389 | 1.00 | 1.64000 | 60.08 |
| 5 | 59.832 | 9.90 | 1.43875 | 94.93 |
| 6 | −1455.027 | 1.76 | | |
| 7 | 61.714 | 7.26 | 1.43875 | 94.93 |
| 8 | −450.325 | 0.10 | | |
| 9 | 48.732 | 5.42 | 1.43875 | 94.93 |
| 10 | 154.746 | Variable | | |
| 11* | 71.659 | 1.00 | 1.76802 | 49.24 |
| 12 | 7.802 | 5.32 | | |
| 13 | −11.800 | 0.52 | 1.49700 | 81.54 |
| 14 | 14.336 | 3.00 | 1.80100 | 34.97 |
| 15 | −147.578 | 1.35 | | |
| 16 | −16.733 | 0.50 | 1.43875 | 94.93 |
| 17 | 141.490 | 1.87 | 1.64000 | 60.08 |
| 18 | −27.698 | Variable | | |
| 19* | 25.707 | 5.00 | 1.49700 | 81.54 |
| 20* | −31.153 | 1.00 | | |
| 21(Stop) | ∞ | 1.00 | | |
| 22 | 218.223 | 0.70 | 1.65160 | 58.55 |
| 23 | 20.813 | 5.30 | 1.43875 | 94.93 |

-continued

Unit mm

| | | | | |
|---|---|---|---|---|
| 24 | −24.583 | 0.20 | | |
| 25 | −133.726 | 0.60 | 1.64000 | 60.08 |
| 26 | 29.637 | Variable | | |
| 27 | 21.438 | 3.20 | 1.43875 | 94.93 |
| 28 | −26.607 | 0.50 | | |
| 29 | 25.184 | 3.20 | 1.43875 | 94.93 |
| 30 | −21.700 | 0.60 | 1.72916 | 54.68 |
| 31 | 55.000 | Variable | | |
| 32 | 41.612 | 0.60 | 1.72916 | 54.68 |
| 33 | 7.442 | 3.00 | 1.51633 | 64.14 |
| 34 | −65.545 | 0.50 | | |
| 35 | 17.159 | 0.80 | 1.67790 | 55.34 |
| 36 | 7.500 | 2.50 | 1.43875 | 94.93 |
| 37 | −112.340 | 4.32 | | |
| 38 | ∞ | 2.12 | 1.51633 | 64.14 |
| 39 | ∞ | 0.40 | | |
| Image plane | ∞ | | | |

Aspheric surface data

11th surface $k = 0.000$
$A4 = 4.86995e-05, A6 = -2.73048e-07, A8 = 1.37129e-10$ 19th surface $k = 0.000$
$A4 = -2.45309e-05, A6 = 2.79409e-08$ 20th surface $k = 0.000$
$A4 = 2.17978e-05, A6 = 2.23538e-08$ Zoom data
Zoom ratio 36.00

| | WE | ST | TE |
|---|---|---|---|
| f | 4.85 | 28.43 | 174.58 |
| FNO. | 1.66 | 3.08 | 3.94 |
| 2ω | 66.42 | 12.29 | 2.03 |
| IH | 3.20 | 3.20 | 3.20 |
| BF (in air) | 6.11 | 6.11 | 6.11 |
| LTL (in air) | 169.25 | 169.25 | 169.25 |
| d10 | 0.60 | 38.31 | 55.57 |
| d18 | 56.92 | 19.21 | 1.95 |
| d26 | 20.11 | 8.13 | 20.82 |
| d31 | 5.23 | 17.21 | 4.52 |

Unit focal length f1 = 72.09   f2 = −9.52   f3 = 44.89   f4 = 32.39   f5 = 107.78

EXAMPLE 6

Unit mm
Surface data

| Surface no. | r | d | nd | vd |
|---|---|---|---|---|
| Object plane | ∞ | ∞ | | |
| 1 | 761.763 | 1.46 | 1.75500 | 52.32 |
| 2 | 72.038 | 10.97 | 1.43875 | 94.93 |
| 3 | −215.403 | 0.10 | | |
| 4 | 142.899 | 1.00 | 1.64000 | 60.08 |
| 5 | 55.732 | 9.90 | 1.43875 | 94.93 |
| 6 | 1313.534 | 0.37 | | |
| 7 | 59.296 | 7.56 | 1.43875 | 94.93 |
| 8 | −678.534 | 0.10 | | |
| 9 | 48.781 | 5.53 | 1.43875 | 94.93 |
| 10 | 160.099 | Variable | | |
| 11* | 57.257 | 1.00 | 1.76802 | 49.24 |
| 12 | 7.632 | 5.45 | | |
| 13 | −11.800 | 0.52 | 1.49700 | 81.54 |
| 14 | 13.743 | 3.00 | 1.80100 | 34.97 |
| 15 | −212.524 | 1.70 | | |
| 16 | −13.906 | 0.50 | 1.43875 | 94.93 |
| 17 | −96.565 | 3.22 | 1.64000 | 60.08 |
| 18 | −21.289 | Variable | | |
| 19(Stop) | ∞ | 1.20 | | |
| 20* | 19.635 | 5.00 | 1.49700 | 81.54 |
| 21* | −36.958 | 0.20 | | |
| 22 | 1489.642 | 0.70 | 1.65160 | 58.55 |
| 23 | 19.461 | 5.30 | 1.43875 | 94.93 |
| 24 | −23.588 | 1.54 | | |
| 25 | −97.248 | 0.60 | 1.64000 | 60.08 |
| 26 | 32.827 | Variable | | |
| 27 | 24.918 | 3.20 | 1.43875 | 94.93 |
| 28 | −26.336 | 0.50 | | |
| 29 | 25.009 | 3.20 | 1.43875 | 94.93 |
| 30 | −21.700 | 0.60 | 1.72916 | 54.68 |
| 31 | 55.000 | Variable | | |
| 32 | 56.731 | 0.60 | 1.72916 | 54.68 |
| 33 | 7.785 | 3.00 | 1.51633 | 64.14 |
| 34 | −79.881 | 2.61 | | |
| 35 | 16.000 | 0.80 | 1.67790 | 55.34 |
| 36 | 7.840 | 2.50 | 1.43875 | 94.93 |
| 37 | −63.424 | 2.14 | | |
| 38 | ∞ | 2.12 | 1.51633 | 64.14 |
| 39 | ∞ | 0.40 | | |
| Image plane | ∞ | | | |

Aspheric surface data

11th surface $k = 0.000$
$A4 = 4.91439e-05, A6 = -2.33489e-07, A8 = -1.93507e-10$ 20th surface $k = 0.000$
$A4 = -2.01479e-05, A6 = 4.07274e-08$ 21th surface $k = 0.000$
$A4 = 3.67763e-05, A6 = 3.98627e-08$ Zoom data
Zoom ratio 36.00

| | WE | ST | TE |
|---|---|---|---|
| f | 4.85 | 28.43 | 174.58 |
| FNO. | 1.76 | 3.22 | 3.90 |
| 2ω | 66.72 | 12.43 | 2.05 |
| IH | 3.20 | 3.20 | 3.20 |
| BF (in air) | 3.95 | 3.95 | 3.95 |
| LTL (in air) | 169.26 | 169.26 | 169.26 |
| d10 | 0.60 | 37.20 | 54.82 |
| d18 | 59.56 | 18.71 | 1.95 |
| d26 | 16.71 | 8.68 | 19.93 |
| d31 | 4.52 | 16.79 | 4.68 |

Unit focal length f1 = 72.24   f2 = −9.70   f3 = 41.04   f4 = 35.49   f5 = 81.87

Next, values of conditional expressions for each example will be given below. Hyphen (-) indicates that there is no corresponding arrangement. Regarding conditional expressions of the partial dispersion ratio, a partial dispersion ratio of each lens element is mentioned. For instance, in conditional expression (1), the two positive lens elements are denoted by LG2p1 and LG2p2, and partial dispersion ratio for LG2p1 and LG2p2 is mentioned. In conditional expression (3), LG22n denotes the negative lens element in the second sub-lens element, and LG23n denotes the negative lens element in the third sub-lens element.

|  | Example1 | Example2 | Example3 |
|---|---|---|---|
| (1)(θg, F)G2p |  |  |  |
| LG2p1 | 0.586 | 0.586 | 0.586 |
| LG2p2 | 0.537 | 0.537 | — |
| (2)(θC, t)G2p |  |  |  |
| LG2p1 | 0.726 | 0.726 | 0.726 |
| LG2p2 | 0.865 | 0.865 | — |
| (3)(θg, F)G2n |  |  |  |
| LG22n | 0.537 | 0.537 | 0.534 |
| LG23n | 0.534 | 0.534 | 0.534 |
| (4)(θC, t)G2n |  |  |  |
| LG22n | 0.826 | 0.826 | 0.837 |
| LG23n | 0.837 | 0.837 | 0.837 |
| (5)fG21/fG22 | 0.16 | 0.02 | 0.00 |
| (6)fG21/fG23 | 0.02 | 0.01 | 0.17 |
| (7)|fG1/d2G| | 1.314 | 1.346 | 1.328 |
| (8)|fG2/fw| | 1.982 | 2.397 | 1.944 |
| (9)|fG2/ft| | 0.055 | 0.080 | 0.064 |
| (10)(θg,F)G1p |  |  |  |
| LG1p1 | 0.5341 | 0.5341 | 0.5341 |
| LG1p2 | 0.5341 | 0.5341 | 0.5341 |
| LG1p3 | 0.5341 | 0.5341 | 0.5341 |
| LG1p4 | 0.5341 | — | 0.5341 |
| (11)(θC, t)G1p |  |  |  |
| LG1p1 | 0.8373 | 0.8373 | 0.8373 |
| LG1p2 | 0.8373 | 0.8373 | 0.8373 |
| LG1p3 | 0.8373 | 0.8373 | 0.8373 |
| LG1p4 | 0.8373 | — | 0.8373 |
| (12)(θg, F)G1n |  |  |  |
| LG1n1 | 0.5475 | 0.5475 | 0.5433 |
| LG1n2 | 0.5370 | 0.5370 | 0.5445 |
| (13)(θC, t)G1n |  |  |  |
| LG1n1 | 0.8107 | 0.8107 | 0.8330 |
| LG1n2 | 0.8645 | 0.8645 | 0.8244 |
| (14)(θg, F)G2nf | 0.5513 | 0.5513 | 0.5444 |
| (15)(θC, t)G2nf | 0.7885 | 0.7885 | 0.8213 |
| (16)(θg, F)G3p |  |  |  |
| LG3p1 | 0.5374 | 0.5374 | 0.5374 |
| LG3p2 | 0.5341 | 0.5341 | 0.5341 |
| (17)(θC, t)G3p |  |  |  |
| LG3p1 | 0.8258 | 0.8258 | 0.8258 |
| LG3p2 | 0.8373 | 0.8373 | 0.8373 |
| (18)(θg, F)G3n |  |  |  |
| LG3n1 | 0.5426 | 0.5426 | 0.5370 |
| LG3n2 | 0.5370 | 0.5370 | 0.5370 |
| (19)(θC, t)G3n |  |  |  |
| LG3n1 | 0.8270 | 0.8270 | 0.8645 |
| LG3n2 | 0.8645 | 0.8645 | 0.8645 |
| (20)(θg, F)G4p |  |  |  |
| LG4p1 | 0.5341 | 0.5341 | 0.5341 |
| LG4p2 | 0.5341 | 0.5341 | 0.5341 |
| (21)(θC, t)G4p |  |  |  |
| LG4p1 | 0.8373 | 0.8373 | 0.8373 |
| LG4p2 | 0.8373 | 0.8373 | 0.8373 |
| (22)(θg, F)G4n | 0.5445 | 0.5445 | 0.6122 |
| (23)(θC, t)G4n | 0.8244 | 0.8244 | 0.6739 |
| (24)(θg, F)G5p |  |  |  |
| LG5p1 | 0.5353 | 0.5353 | 0.5374 |
| LG5p2 | 0.5341 | 0.5341 | 0.5341 |
| (25)(θC, t)G5p |  |  |  |
| LGSp1 | 0.8687 | 0.8687 | 0.8258 |
| LG5p2 | 0.8373 | 0.8373 | 0.8373 |
| (26)(θg, F)G5n |  |  |  |
| LG5n1 | 0.5445 | 0.5445 | 0.5370 |
| LG5n2 | 0.5472 | 0.5472 | 0.5370 |
| (27)(θC, t)G5n |  |  |  |
| LG5n1 | 0.8244 | 0.8244 | 0.8645 |
| LG5n2 | 0.8045 | 0.8045 | 0.8645 |
| (28)|FSw| | 0.852 | 0.876 | 0.857 |
| (29)|FSt| | 0.827 | 0.942 | 0.959 |
| (30)|fG22n/fG22p| | 0.80 | 0.91 | 0.97 |

|  | Example4 | Example5 | Example6 |
|---|---|---|---|
| (1)(θg, F)G2p |  |  |  |
| LG2p1 | 0.586 | 0.586 | 0.586 |
| LG2p2 | — | 0.537 | 0.537 |
| (2)(θC, t)G2p |  |  |  |
| LG2p1 | 0.726 | 0.726 | 0.726 |
| LG2p2 | — | 0.865 | 0.865 |
| (3)(θg, F)G2n |  |  |  |
| LG22n | 0.534 | 0.537 | 0.537 |
| LG23n | 0.534 | 0.534 | 0.534 |
| (4)(θC, t)G2n |  |  |  |
| LG22n | 0.837 | 0.826 | 0.826 |
| LG23n | 0.837 | 0.837 | 0.837 |
| (5)fG21/fG22 | 0.67 | 0.17 | 0.18 |
| (6)fG21/fG23 | −0.51 | 0.01 | 0.01 |
| (7)|fG1/d2G| | 1.309 | 1.311 | 1.332 |
| (8)|fG2/fw| | 1.953 | 1.963 | 2.000 |
| (9)|fG2/ft| | 0.058 | 0.055 | 0.056 |
| (10)(θg, F)G1p |  |  |  |
| LG1p1 | 0.5341 | 0.5341 | 0.5341 |
| LG1p2 | 0.5341 | 0.5341 | 0.5341 |
| LG1p3 | 0.5341 | 0.5341 | 0.5341 |
| LG1p4 | 0.5341 | 0.5341 | 0.5341 |
| (11)(θC, t)G1p |  |  |  |
| LG1p1 | 0.8373 | 0.8373 | 0.8373 |
| LG1p2 | 0.8373 | 0.8373 | 0.8373 |
| LG1p3 | 0.8373 | 0.8373 | 0.8373 |
| LG1p4 | 0.8373 | 0.8373 | 0.8373 |
| (12)(θg, F)G1n |  |  |  |
| LG1n1 | 0.5433 | 0.5475 | 0.5475 |
| LG1n2 | 0.5445 | 0.5370 | 0.5370 |
| (13)(θC, t)G1n |  |  |  |
| LG1n1 | 0.8330 | 0.8107 | 0.8107 |
| LG1n2 | 0.8244 | 0.8645 | 0.8645 |
| (14)(θg, F)G2nf | 0.5444 | 0.5513 | 0.5513 |
| (15)(θC, t)G2nf | 0.8213 | 0.7885 | 0.7885 |
| (16)(θg, F)G3p |  |  |  |
| LG3p1 | 0.5374 | 0.5374 | 0.5374 |
| LG3p2 | 0.5341 | 0.5341 | 0.5341 |
| (17)(θC, t)G3p |  |  |  |
| LG3p1 | 0.8258 | 0.8258 | 0.8258 |
| LG3p2 | 0.8373 | 0.8373 | 0.8373 |
| (18)(θg, F)G3n |  |  |  |
| LG3n1 | 0.5370 | 0.5426 | 0.5426 |
| LG3n2 | 0.5370 | 0.5370 | 0.5370 |
| (19)(θC, t)G3n |  |  |  |
| LG3n1 | 0.8645 | 0.8270 | 0.8270 |
| LG3n2 | 0.8645 | 0.8645 | 0.8645 |
| (20)(θg, F)G4p |  |  |  |
| LG4p1 | 0.5341 | 0.5341 | 0.5341 |
| LG4p2 | 0.5341 | 0.5341 | 0.5341 |

-continued

| (21)(θC, t)G4p | | | |
|---|---|---|---|
| LG4p1 | 0.8373 | 0.8373 | 0.8373 |
| LG4p2 | 0.8373 | 0.8373 | 0.8373 |
| (22)(θg, F)G4n | 0.6122 | 0.5445 | 0.5445 |
| (23)(θC, t)G4n | 0.6739 | 0.8244 | 0.8244 |
| (24)(θg, F)G5p | | | |
| LG5p1 | 0.5374 | 0.5353 | 0.5353 |
| LG5p2 | 0.5341 | 0.5341 | 0.5341 |
| (25)(θC, t)G5p | | | |
| LG5p1 | 0.8258 | 0.8687 | 0.8687 |
| LG5p2 | 0.8373 | 0.8373 | 0.8373 |
| (26)(θg, F)G5n | | | |
| LG5n1 | 0.5370 | 0.5445 | 0.5445 |
| LG5n2 | 0.5370 | 0.5472 | 0.5472 |
| (27)(θC, t)G5n | | | |
| LG5n1 | 0.8645 | 0.8244 | 0.8244 |
| LG5n2 | 0.8645 | 0.8045 | 0.8045 |
| (28)|FSw| | 0.842 | 0.858 | 0.825 |
| (29)|FSt| | 0.908 | 0.846 | 0.829 |
| (30)|fG22n/fG22p| | 1.00 | 0.79 | 0.78 |

The variable magnification optical system of the present embodiment is especially suitable for an optical system for security camera. However, the variable magnification optical system of the present embodiment can be used for an optical system for a car-mounted camera, an optical system for a single-lens mirrorless camera, or an optical system for a compact digital camera.

Figure 13:
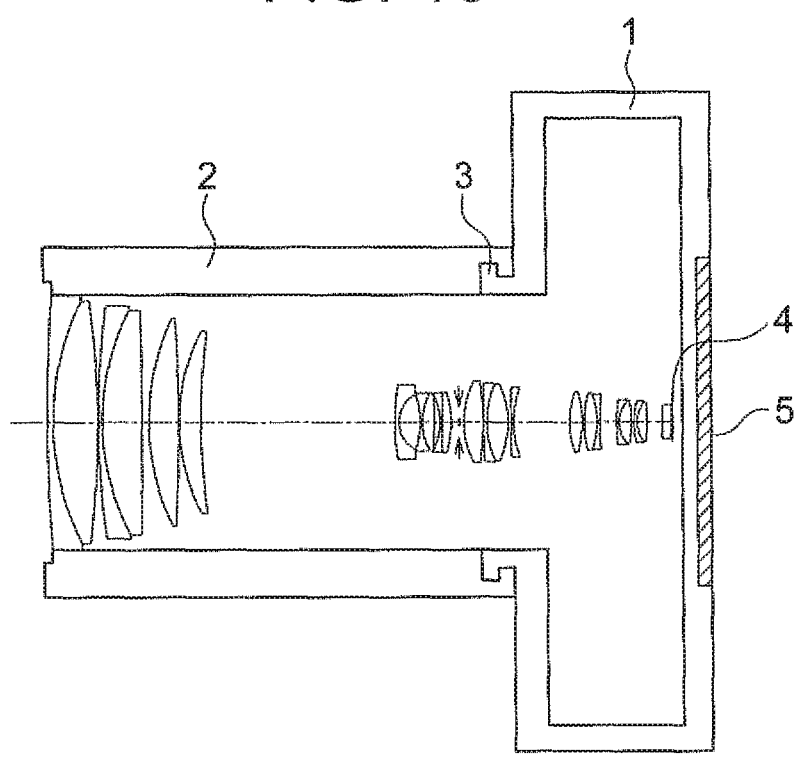
FIG. 13 is a cross-sectional view of an image pickup apparatus.

FIG. 13 is a cross-sectional view of a single-lens mirrorless camera as an electronic image pickup apparatus. In FIG. 13, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the variable magnification optical system described in any one of the examples from the first example to the sixth example is to be used.

Figure 14:
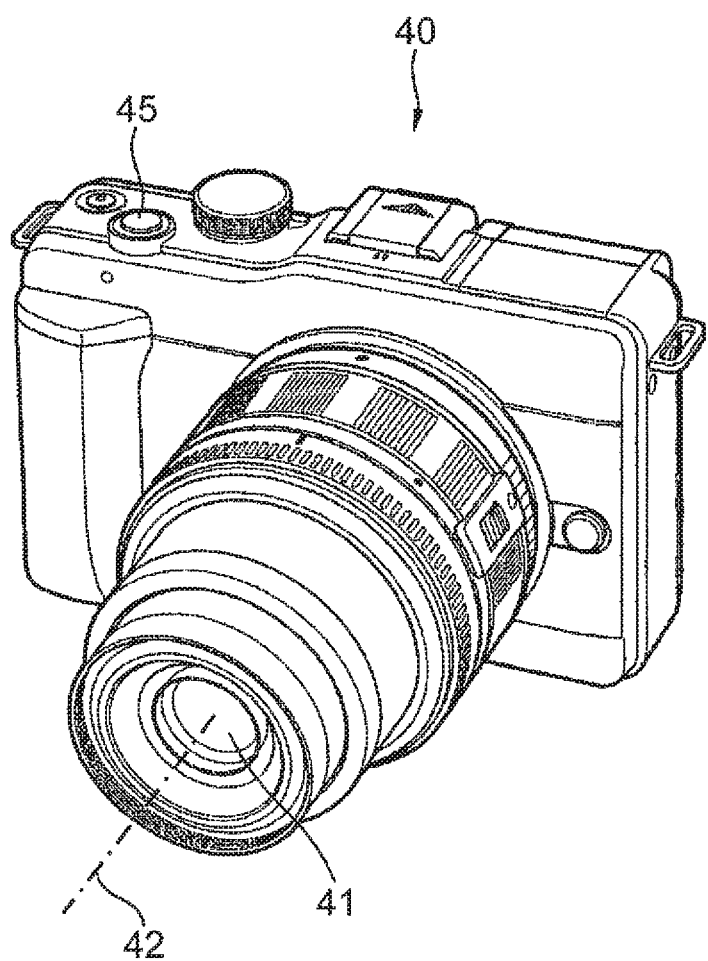
FIG. 14 is a front perspective view of the image pickup apparatus.
Figure 15:
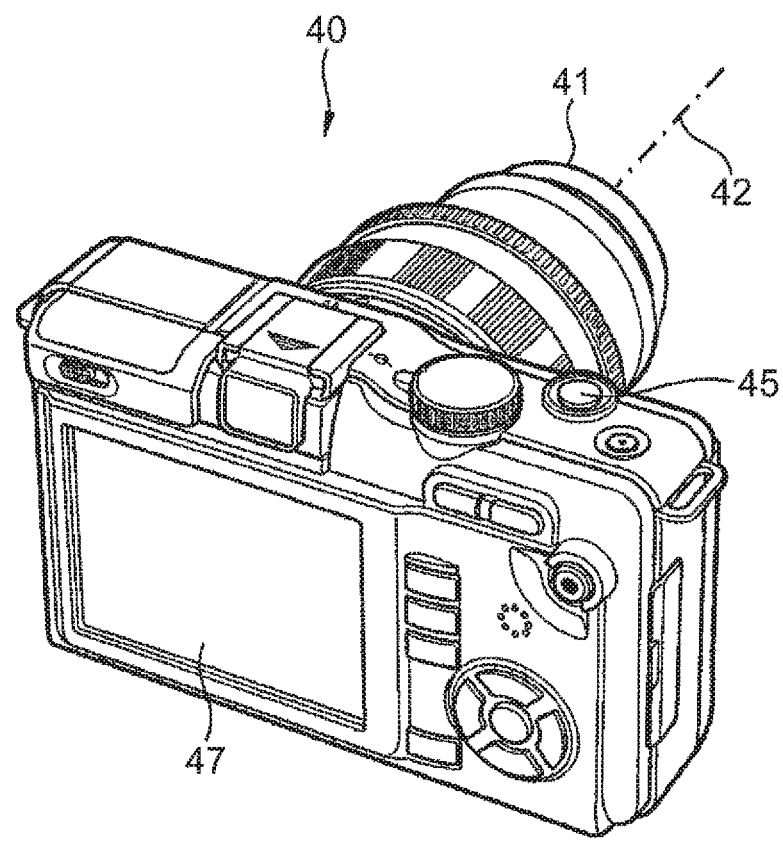
FIG. 15 is a rear perspective view of the image pickup apparatus.

FIG. 14 and FIG. 15 are conceptual diagrams of an arrangement of the image pickup apparatus. FIG. 14 is a front perspective view of a digital camera 40 as the image pickup apparatus, and FIG. 15 is a rear perspective view of the digital camera 40. The variable magnification optical system according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the variable magnification optical system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 16:
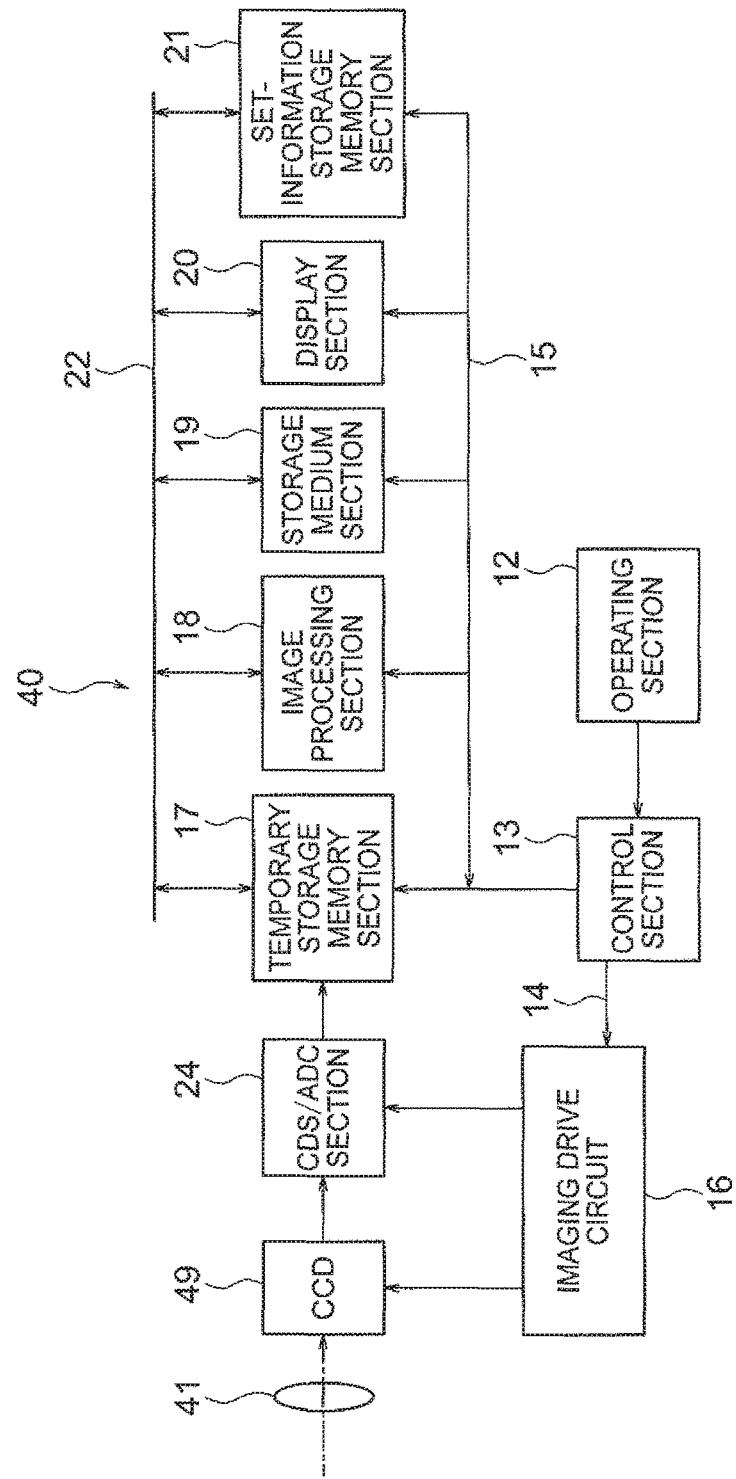
FIG. 16 is a structural block diagram of an internal circuit of main components of the image pickup apparatus.

FIG. 16 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 16, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

By using the variable magnification optical system according to the example as the photographic optical system 41, it is possible to let the digital camera 40 configured in such manner to be an image pickup apparatus which is a small size and able to obtain an image with high quality.

The present invention can have various modified examples without departing from the scope of the invention. Moreover, shapes of lenses and the number of lenses are not necessarily restricted to the shapes and the number of lenses indicated in the examples. In the examples described heretofore, the cover glass C may not be disposed necessarily. A lens that is not shown in the diagrams of the examples described above, and that does not have a refractive power practically may be disposed in a lens unit or outside the lens unit.

According to the present embodiment, it is possible to provide a variable magnification optical system which is small-sized and has a high imaging performance, and in which a front-lens diameter is small, and the chromatic aberration is corrected favorably while shortening the overall length of the optical system, and an image pickup apparatus using the same.

In such manner, the present invention is suitable for a variable magnification optical system which is small-sized and has a high imaging performance, and in which, a front-lens diameter is small, and the chromatic aberration is corrected favorably while shortening the overall length of the optical system, and an image pickup apparatus using the same.

What is claimed is:

1. A variable magnification optical system having a plurality of lens elements, comprising in order from an object side:
a first lens unit having a positive refractive power;
a second lens unit having a negative refractive power;
a third lens unit having a positive refractive power; and
at least one lens unit, wherein
an aperture stop which determines an optical axial light beam is positioned between an image-side surface of the second lens unit and an image-side surface of the third lens unit, and
at a time of zooming from a wide angle end to a telephoto end,
the second lens unit moves from the object side to an image side, and
at least one of the lens units positioned on the image side of the aperture stop moves, and
a second predetermined positive lens element satisfies the following conditional expressions (1) and (2), and
a second predetermined negative lens element satisfies the following conditional expressions (3) and (4), and
the second lens unit includes in order from the object side,
a first sub-lens unit having a negative refractive power,
a second sub-lens unit having a negative lens element, and a third sub-lens unit having a negative lens element, and
at least one of the second sub-lens unit and the third sub-lens unit includes a positive lens element, and
the following conditional expressions (5) and (6) are satisfied:

$$0.520<(\theta g,F)G2p<0.610 \quad (1),$$

$$0.680<(\theta C,t)G2p<0.900 \quad (2),$$

$$0.520<(\theta g,F)G2n<0.560 \quad (3),$$

$$0.750<(\theta C,t)G2n<0.900 \quad (4),$$

$$-0.25<fG21/fG22<0.90 \quad (5), \text{ and}$$

$$-0.70<fG21/fG23<0.40 \quad (6)$$

where,
fG21 denotes a focal length of the first sub-lens unit,
fG22 denotes a focal length of the second sub-lens unit,
fG23 denotes a focal length of the third sub-lens unit,
$(\theta g, F)$ G2p denotes a partial dispersion ratio of the second predetermined positive lens element,
$(\theta C, t)$ G2p denotes a partial dispersion ratio of the second predetermined positive lens element,
$(\theta g, F)$ G2n denotes a partial dispersion ratio of the second predetermined negative lens element,
$(\theta C, t)$ G2n denotes a partial dispersion ratio of the second predetermined negative lens element, $$(\theta g,F)=(ng-nF)/(nF-nC),$$

$$(\theta C,t)=(nC-nt)/(nF-nC),$$

where,
ng denotes a refractive index for a g-line,
nF denotes a refractive index for an F-line,
nC denotes a refractive index for a C-line,
nt denotes a refractive index for a t-line, and
the second predetermined positive lens element is all positive lens elements in the second lens unit,
the second predetermined negative lens element is the negative lens element in the second sub-lens unit and the negative lens element in the third sub-lens unit, and
the lens element is a lens having a medium of a refractive index higher than 1 filled between an object-side surface and an image-side surface, and having no refracting surface between the object-side surface and the image-side surface.

2. The variable magnification optical system according to claim 1, wherein the first lens unit includes at least three positive lens elements and at least two negative lens elements.

3. The variable magnification optical system according to claim 1, wherein a position of the first lens unit is fixed at the time of zooming.

4. The variable magnification optical system according to claim 1, wherein the following conditional expression (7) is satisfied:

$$1.10<|fG1/d2G|<1.50 \quad (7)$$

where,
fG1 denotes a focal length of the first lens unit, and
d2G denotes an amount of movement of the second lens unit from the wide angle end up to the telephoto end.

5. The variable magnification optical system according to claim 1, wherein the following conditional expression (8) is satisfied:

$$1.60<|fG2/fw|<2.80 \quad (8)$$

where,
fG2 denotes a focal length of the second lens unit, and
fw denotes a focal length of the overall variable magnification optical system at the wide angle end.

6. The variable magnification optical system according to claim 1, wherein the following conditional expression (9) is satisfied:

$$0.030 < |fG2/ft| < 0.100 \quad (9)$$

where,
fG2 denotes a focal length of the second lens unit, and
ft denotes a focal length of the overall variable magnification optical system at the telephoto end.

7. The variable magnification optical system according to claim 1, wherein the variable magnification optical system is a five-unit type variable magnification optical system consisting of from the object side, the first lens unit, the second lens unit, the third lens unit, a fourth lens unit having a positive refractive power, and a fifth lens unit.

8. The variable magnification optical system according to claim 1, wherein
a first predetermined positive lens element satisfies the following conditional expressions (10) and (11), and
a first predetermined negative lens element satisfies the following conditional expressions (12) and (13):

$$0.520 < (\theta g, F)G1p < 0.560 \quad (10),$$

$$0.780 < (\theta C, t)G1p < 0.90 \quad (11),$$

$$0.520 < (\theta g, F)G1n < 0.560 \quad (12), \text{ and}$$

$$0.780 < (\theta C, t)G1n < 0.90 \quad (13),$$

where,
$(\theta g, F)$ G1p denotes a partial dispersion ratio of the first predetermined positive lens element,
$(\theta C, t)$ G1p denotes a partial dispersion ratio of the first predetermined positive lens element,
$(\theta g, F)$ G1n denotes a partial dispersion ratio of the first predetermined negative lens element,
$(\theta C, t)$ G1n denotes a partial dispersion ratio of the first predetermined negative lens element,
where,
ng denotes the refractive index for the g-line,
nF denotes the refractive index for the F-line,
nC denotes the refractive index for the C-line, and
nt denotes the refractive index for the t-line, and
the first predetermined positive lens element is all positive lens elements in the first lens unit, and
the first predetermined negative lens element is all negative lens elements in the first lens unit.

9. The variable magnification optical system according to claim 1, wherein
the second lens unit includes an object-side negative lens element, and
the object-side negative lens element is positioned nearest to object, and
the following conditional expressions (14) and (15) are satisfied:

$$0.530 < (\theta g, F)G2nf < 0.580 \quad (14), \text{ and}$$

$$0.720 < (\theta C, t)G2nf < 0.860 \quad (15)$$

where,
$(\theta g, F)$ G2nf denotes a partial dispersion ratio of the object-side negative lens element,
$(\theta C, t)$ G2nf denotes a partial dispersion ratio of the object-side negative lens element, $$(\theta g, F) = (ng - nF)/(nF - nC),$$

$$(\theta C, t) = (nC - nt)/(nF - nC),$$

where,
ng denotes the refractive index for the g-line,
nF denotes the refractive index for the F-line,
nC denotes the refractive index for the C-line, and
nt denotes the refractive index for the t-line.

10. The variable magnification optical system according to claim 1, wherein
a third predetermined positive lens element satisfy the following conditional expressions (16) and (17), and
a third predetermined negative lens element satisfies the following conditional expressions (18) and (19):

$$0.520 < (\theta g, F)G3p < 0.560 \quad (16),$$

$$0.780 < (\theta C, t)G3p < 0.90 \quad (17),$$

$$0.520 < (\theta g, F)G3n < 0.560 \quad (18), \text{ and}$$

$$0.780 < (\theta C, t)G3n < 0.90 \quad (19)$$

where,
$(\theta g, F)$ G3p denotes a partial dispersion ratio of the third predetermined positive lens element,
$(\theta C, t)$ G3p denotes a partial dispersion ratio of the third predetermined positive lens element,
$(\theta g, F)$ G3n denotes a partial dispersion ratio of the third predetermined negative lens element,
$(\theta C, t)$ G3n denotes a partial dispersion ratio of the third predetermined negative lens element, $$(\theta g, F) = (ng - nF)/(nF - nC),$$

$$(\theta C, t) = (nC - nt)/(nF - nC),$$

ng denotes the refractive index for the g-line,
nF denotes the refractive index for the F-line,
nC denotes the refractive index for the C-line,
nt denotes the refractive index for the t-line,
the third predetermined positive lens element is all positive lens elements in the third lens unit, and
the third predetermined negative lens element is all negative lens elements in the third lens unit.

11. The variable magnification optical system according to claim 1, wherein
a fourth predetermined positive lens element satisfy the following conditional expressions (20) and (21), and
a fourth predetermined negative lens element satisfies the following conditional expressions (22) and (23):

$$0.520 < (\theta g, F)G4p < 0.560 \quad (20),$$

$$0.780 < (\theta C, t)G4p < 0.900 \quad (21),$$

$$0.520 < (\theta g, F)G4n < 0.640 \quad (22), \text{ and}$$

$$0.640 < (\theta C, t)G4n < 0.900 \quad (23)$$

where,
$(\theta g, F)$ G4p denotes a partial dispersion ratio of the fourth predetermined positive lens element,
$(\theta C, t)$ G4p denotes a partial dispersion ratio of the fourth predetermined positive lens element,
$(\theta g, F)$ G4n denotes a partial dispersion ratio of the fourth predetermined negative lens element, (θC, t) G4n denotes a partial dispersion ratio of the fourth predetermined negative lens element, $(\theta g, F) = (ng - nF)/(nF - nC)$, $(\theta C, t) = (nC - nt)/(nF - nC)$, ng denotes the refractive index for the g-line,
nF denotes the refractive index for the F-line,
nC denotes the refractive index for the C-line,
nt denotes the refractive index for the t-line,
the fourth predetermined positive lens element is all positive lens elements in the fourth lens unit, and
the fourth predetermined negative lens element is all negative lens elements in the fourth lens unit.

12. The variable magnification optical system according to claim 1, wherein
a fifth predetermined positive lens element satisfy the following conditional expressions (24) and (25), and
a fifth predetermined negative lens element satisfies the following conditional expressions (26) and (27):

$0.520 < (\theta g, F) G5p < 0.560$ (24), $0.780 < (\theta C, t) G5p < 0.900$ (25), $0.520 < (\theta g, F) G5n < 0.560$ (26), and $0.780 < (\theta C, t) G5n < 0.900$ (27)

where,
(θg, F) G5p denotes a partial dispersion ratio of the fifth predetermined positive lens element,
(θC, t) G5p denotes a partial dispersion ratio of the fifth predetermined positive lens element,
(θg, F) G5n denotes a partial dispersion ratio of the fifth predetermined negative lens element,
(θC, t) G5n denotes a partial dispersion ratio of the fifth predetermined negative lens element, $(\theta g, F) = (ng - nF)/(nF - nC)$, $(\theta C, t) = (nC - nt)/(nF - nC)$, ng denotes the refractive index for the g-line,
nF denotes the refractive index for the F-line,
nC denotes the refractive index for the C-line,
nt denotes the refractive index for the t-line,
the fifth predetermined positive lens element is all positive lens elements in the fifth lens unit, and
the fifth predetermined negative lens element is all negative lens elements in the fifth lens unit.

13. The variable magnification optical system according to claim 1, wherein
the variable magnification optical system includes a focusing unit on the image side of the third lens unit, which moves in an optical axial direction at the time of focusing, and
the following conditional expression (28) is satisfied:

$0.50 < |FSw| < 1.00$ (28)

where, $FSw = (1 - \beta fow \times \beta fow) \times \beta imgw \times \beta imgw$ here,
βfow denotes a lateral magnification of the focusing unit at the wide angle end, and
βimgw denotes a lateral magnification of a predetermined optical system at the wide angle end, and
the predetermined optical system is an optical system which includes all lens units positioned on the image side of the focusing unit.

14. The variable magnification optical system according to claim 1, wherein
the variable magnification optical system includes a focusing unit on the image side of the third lens unit, which moves in an optical axial direction at the time of focusing, and
the following conditional expression (29) is satisfied:

$0.50 < |FSt| < 1.20$ (29)

where, $FSt = (1 - \beta fot \times \beta fot) \times \beta imgt \times \beta imgt$ here,
βfot denotes a lateral magnification of the focusing unit at the telephoto end, and
βimgt denotes a lateral magnification of a predetermined optical system at the telephoto end, and
the predetermined optical system is an optical system which includes all lens units positioned on the image side of the focusing unit.

15. The variable magnification optical system according to claim 1, wherein
at the time of zooming, the fourth lens unit moves, and
the fourth lens unit includes in order from the object side, a positive lens element, a positive lens element, and a negative lens element.

16. The variable magnification optical system according to claim 1, wherein
at the time of zooming, a position of the fifth lens unit is fixed, and
the fifth lens unit includes in order from the object side, a first negative lens element, a first positive lens element, a second negative lens element, and a second positive lens element, and
the first negative lens element and the first positive lens element are cemented, and
the second negative lens element and the second positive lens element are cemented.

17. The variable magnification optical system according to claim 1, wherein
the second sub-lens unit includes a first lens element, and
the first lens element is the negative lens element in the second sub-lens unit, and
the second lens unit includes a second lens element having a positive refractive power, and the second lens element is positioned on the image side of the first lens element, and
the following conditional expression (30) is satisfied:

$0.65 < |fG22n/fG22p| < 1.30$ (30)

where,
fG22n denotes a focal length of the first lens element, and
fG22p denotes a focal length of the second lens element.

18. The variable magnification optical system according to claim 1, wherein at the time of zooming, a position of the third lens unit is fixed.

19. An image pickup apparatus, comprising:
an optical system; and
an image pickup element which has an image pickup surface, and which converts an image formed on the image pickup surface by the optical system to an electric signal, wherein
the optical system is a variable magnification optical system according to claim 1.

* * * * *